(12) United States Patent
Li et al.

(10) Patent No.: US 11,815,746 B1
(45) Date of Patent: Nov. 14, 2023

(54) METHOD AND APPARATUS FOR ASTIGMATIC CORRECTION IN ELECTRONICALLY TUNABLE PRESCRIPTION GLASSES

(71) Applicant: Amazon Technologies, Inc., Seattle, WA (US)

(72) Inventors: Jim Weijian Li, Fremont, CA (US); Isabella T. Lewis, San Jose, CA (US); Robert Arthur Sprague, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/490,441

(22) Filed: Sep. 30, 2021

(51) Int. Cl.
| | |
|---|---|
| *G02C 7/06* | (2006.01) |
| *G02F 1/1343* | (2006.01) |
| *G02F 1/29* | (2006.01) |
| *G02F 1/137* | (2006.01) |

(52) U.S. Cl.
CPC ............ *G02C 7/061* (2013.01); *G02F 1/137* (2013.01); *G02F 1/134309* (2013.01); *G02F 1/294* (2021.01)

(58) Field of Classification Search
None
See application file for complete search history.

(56) References Cited

U.S. PATENT DOCUMENTS

| | | | | |
|---|---|---|---|---|
| 11,442,332 | B1* | 9/2022 | Sprague | G02C 7/083 |
| 2010/0157181 | A1* | 6/2010 | Takahashi | H04N 13/305 |
| | | | | 349/200 |
| 2018/0088381 | A1* | 3/2018 | Lin | G02F 1/13471 |
| 2019/0265514 | A1* | 8/2019 | Richards | G02C 7/022 |
| 2019/0346718 | A1* | 11/2019 | Liu | G02F 1/133526 |
| 2021/0041762 | A1* | 2/2021 | Ye | G02F 1/29 |
| 2021/0072547 | A1* | 3/2021 | Heugten | G02B 27/0172 |
| 2021/0240018 | A1* | 8/2021 | Schowengerdt | G02B 26/0825 |
| 2021/0318589 | A1* | 10/2021 | Van Heugten | G02F 1/134309 |

FOREIGN PATENT DOCUMENTS

WO WO-2022197603 A1 * 9/2022

OTHER PUBLICATIONS

Li et al., "Near-Diffraction-Limited Tunable Liquid Crystal Lens with Simplified Design," Kent State University, Optical Engineering vol. 52(3), Mar. 13, 2013, 8 pages.

* cited by examiner

Primary Examiner — Ryan Crockett
(74) Attorney, Agent, or Firm — Kilpatrick Townsend & Stockton LLP

(57) ABSTRACT

An optical system includes a circular lens having a first set of electrodes arranged in a concentric pattern and a liquid crystal material in electrical communication with the first set of electrodes. The optical system also includes a first cylindrical lens having a vertical meridian and a second set of electrodes oriented along an axis parallel to the vertical meridian. The optical system additionally includes a second cylindrical lens having a third set of electrodes oriented at an angle with respect to the axis.

20 Claims, 17 Drawing Sheets

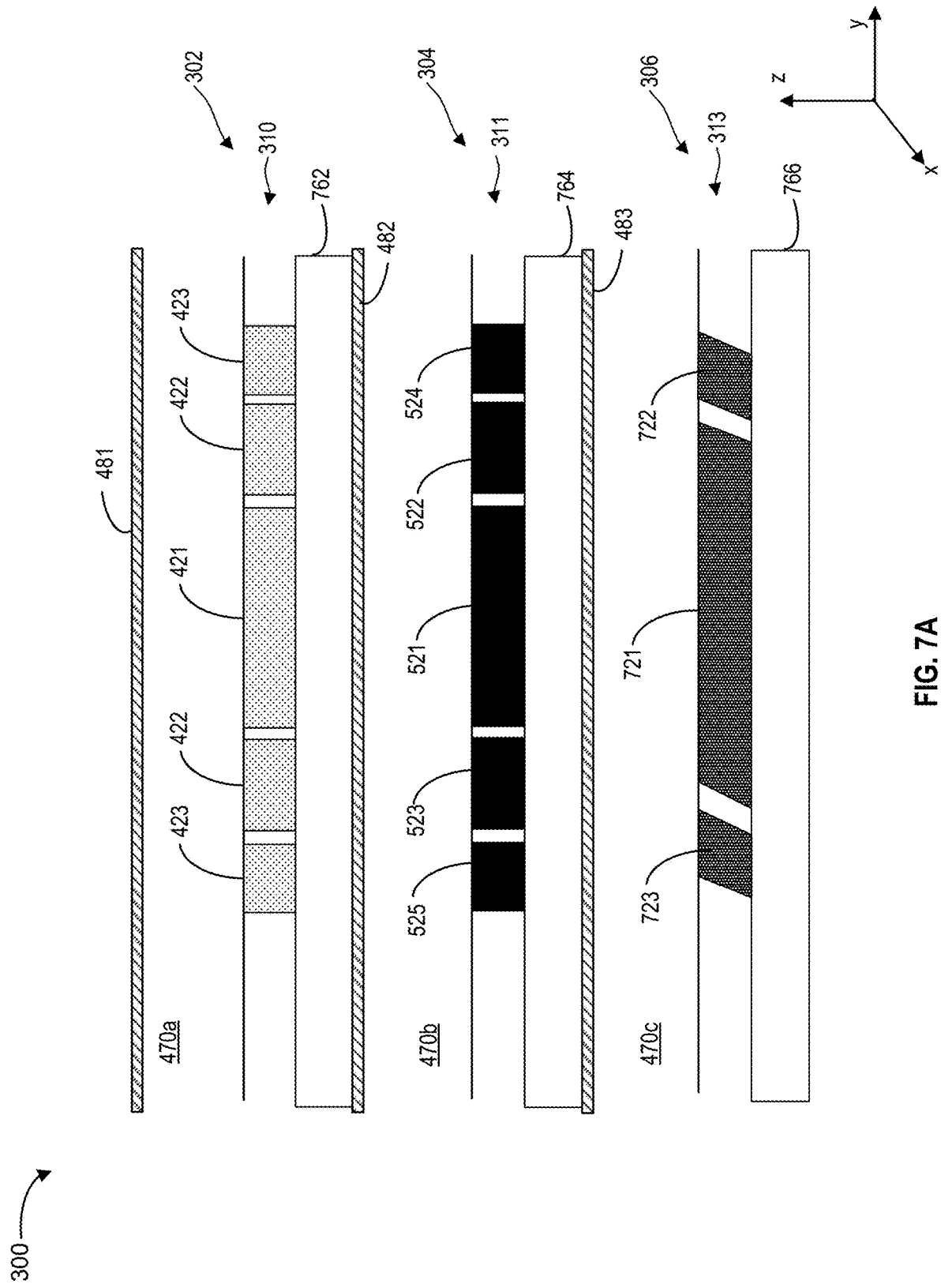

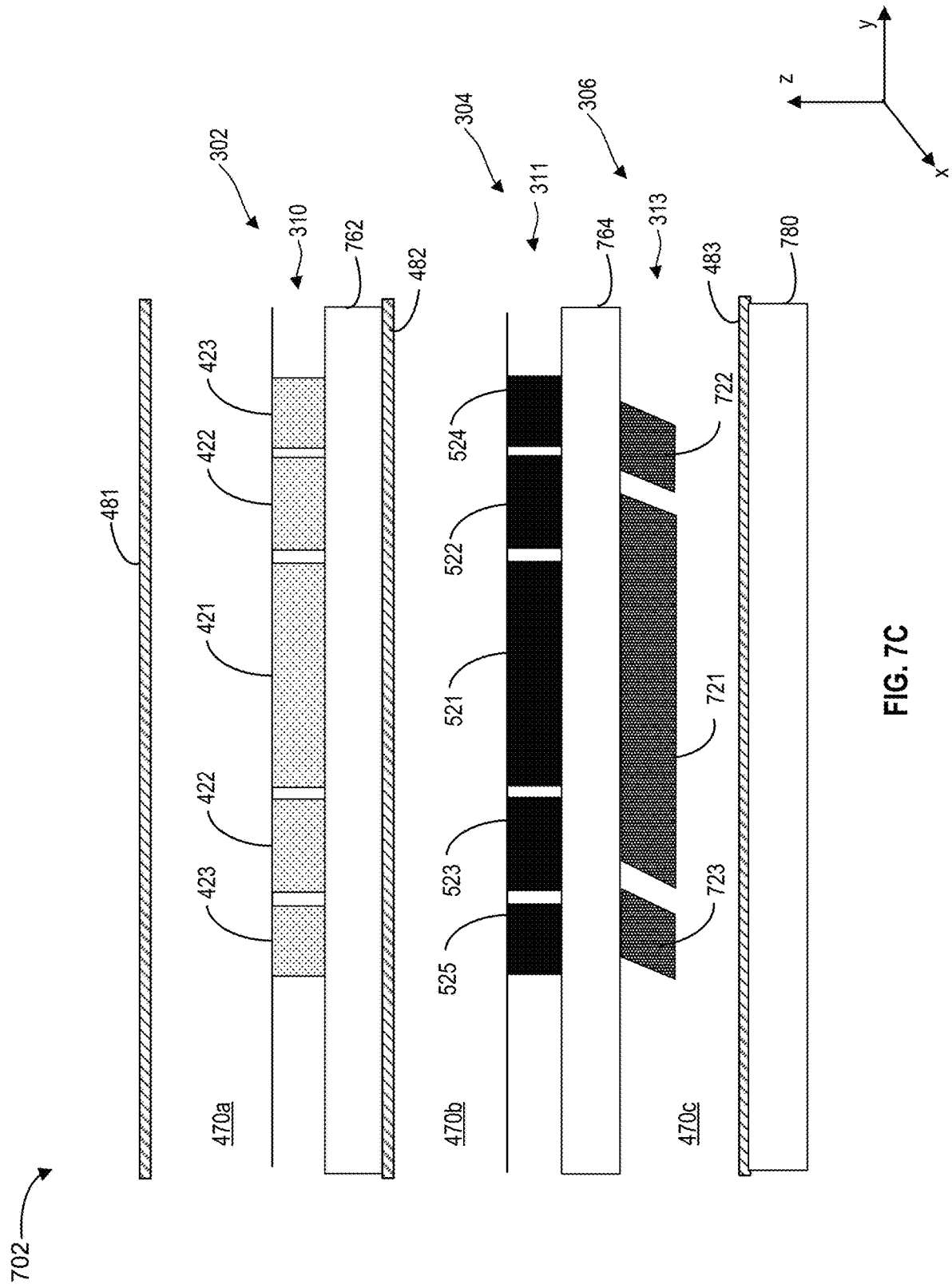

| Wave-front Map | Power of Astigmatism (diopter) $1/f_A$ | $f_A$ (mm) | Axis of Astigmatism (deg.) | Power of Cyl. Lens 1 (Diopter) | $f_y$ (mm) | Power of Cyl. Lens 2 (Diopter) | $f_{xy}$ (mm) | RMS Wavefront Error (waves) |
|---|---|---|---|---|---|---|---|---|
|  | 0.6 | 1670 | 0 | 0.6 | 1670 | 0 | 0 | 1.22 |
|  | 0.6 | 1670 | 18 | 0.48 | 2064 | 0.35 | 2841 | 1.22 |
|  | 1.5 | 668 | -57 | 0.61 | -1642 | 1.37 | -731 | 3.0 |
|  | 2.15 | 464 | 85 | 2.12 | -471 | -0.37 | 2671 | 4.4 |

902
Assign a first value for a power of astigmatism and a second value for an axis of astigmatism

904
Determine a power of a first cylindrical lens and a power of a second cylindrical lens based at least in part on the power of astigmatism and the axis of astigmatism

906
Apply one or more voltages to achieve power of first cylindrical lens and power of second cylindrical lens

908
Astigmatism corrected?

N → (back to 902)
Y ↓

910
End

FIG. 9

METHOD AND APPARATUS FOR ASTIGMATIC CORRECTION IN ELECTRONICALLY TUNABLE PRESCRIPTION GLASSES

BACKGROUND

Liquid crystal materials have been used to provide an optical material that can provide dynamic matching between the index of refraction of the liquid crystal materials and the materials surrounding the liquid crystal materials. In a specific application, liquid crystal lenses can be fabricated using a layer of liquid crystal material sandwiched between two transparent substrates. Electrodes are integrated into the structure to provide control signals used to modulate the phase of light propagating through the liquid crystal lens.

Despite the progress made in the area of optical materials and systems, there is a need in the art for improved methods and systems related to correction of astigmatism in electronically tunable prescription glasses.

BRIEF DESCRIPTION OF THE DRAWINGS

Various embodiments in accordance with the present disclosure will be described with reference to the drawings, in which:

FIG. 7A illustrates a cross section view of a portion of an astigmatic liquid crystal Fresnel lens according to an embodiment of the present disclosure;

FIG. 7C illustrates a cross section view of a portion of an astigmatic liquid crystal Fresnel lens according to an embodiment of the present disclosure;

FIG. 8 illustrates a table including exemplary results of correcting astigmatism with an astigmatic liquid crystal Fresnel lens according to an embodiment of the present disclosure;

FIG. 9 illustrates an example of a flow for operating an astigmatic liquid crystal Fresnel lens according to an embodiment of the present disclosure;

DETAILED DESCRIPTION

Figure 1:
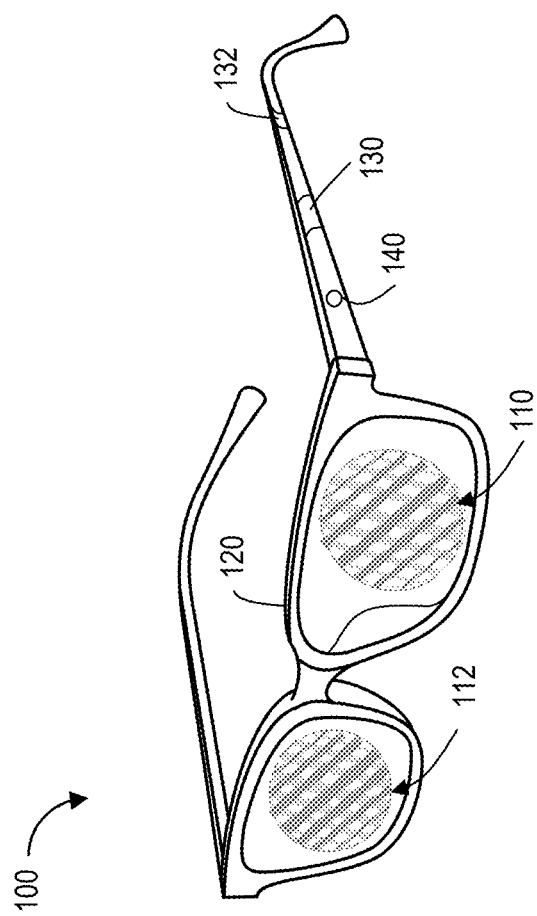
FIG. 1 illustrates a schematic diagram of an optical system incorporating a set of astigmatic liquid crystal Fresnel lenses according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, optical systems including a tunable liquid crystal lens that is suitable for use in ophthalmic, augmented reality, and other applications. The tunable liquid crystal lens is tunable in the sense that the focal length of the lens can be electrically controlled to provide tunable optical power, astigmatism correction, and rotation of the astigmatic axis.

In an example, a liquid crystal lens includes transparent electrodes on the input and output faces of a structure including a liquid crystal material and a housing. As an example, indium tin oxide (ITO) can be utilized to form the transparent electrodes. When a voltage is placed across the transparent electrodes, the index of refraction of the liquid crystal material disposed between the transparent electrodes changes in response to the application of the voltage. In a first state, i.e., a zero-power state, no voltage is placed across the transparent electrodes and the index of refraction of the liquid crystal lens material is matched to the index of refraction of the housing. As a result of the matching index of refraction of the liquid crystal lens material and the housing, the "lens" has no optical power, which is equivalent to a focal length of the lens of $R=\infty$. In a second state, i.e., a finite optical power state, a non-zero voltage is placed across the transparent electrodes and the index of refraction of the liquid crystal lens material changes to a value different from the index of refraction of the housing. As a result of the difference in the index of refraction of liquid crystal lens material and the housing, the "lens" has a finite optical power, also referred to as spherical optical power, which is equivalent to a focal length of the lens of $R=R_1$. By varying the voltage that is placed across the transparent electrodes over a range of voltage levels, the optical power can be varied to produce a range of focal lengths from $R_1 < R < \infty$.

In order to introduce astigmatism in the liquid crystal lens in addition to spherical optical power, embodiments of the present disclosure utilize two cylindrical liquid crystal lenses. Each of the cylindrical liquid crystal lenses include linear electrodes. The electrodes of the first cylindrical liquid crystal lens are aligned with a vertical meridian of the first cylindrical liquid crystal lens. The electrodes of the second cylindrical liquid crystal lens are oriented at an angle (e.g., not equal to 0 degrees and 90 degrees) with respect to the vertical meridian. Using these electrodes, a predetermined astigmatism can be corrected by providing a voltage to the electrodes that is correlated to a predetermined correction for the predetermined astigmatism. The voltages applied to the electrodes are determined based on a power of astigmatism and an axis of astigmatism that are to be corrected. Accordingly, the tunable, astigmatic liquid crystal Fresnel lens described herein provides astigmatism correction for varying powers of astigmatism and axes of astigmatism by applying appropriate voltages to the electrodes.

FIG. 1 illustrates a schematic diagram of an optical system incorporating a set of astigmatic liquid crystal Fresnel lenses according to an embodiment of the present disclosure. The optical system 100 includes tunable astigmatic lenses 110 and 112, a frame 120 supporting tunable astigmatic lenses 110 and 112, and a power source 130. In the example, illustrated in FIG. 1, the frame 120 is implemented as a pair of glasses, for example, reading glasses. The user, by actuating a switch 140, can connect the tunable astigmatic lenses 110 and 112 to the power source 130 and the controller 132, switching the tunable astigmatic lenses 110 and 112 from a non-powered mode in which the tunable astigmatic lenses 110 and 112 are characterized by no optical power to a powered mode in which the tunable astigmatic lenses 110 and 112 are characterized by a predetermined optical power and a predetermined power of astigmatism oriented at a predetermined axis of rotation, or axis of astigmatism. Thus, the user is provided with reading glasses that not only provide spherical optical power, but astigmatism correction appropriate for the user. In some embodiments, the tunable astigmatic lenses 110 and 112 are independently operated to produce a different optical power and astigmatism, thereby providing a different astigmatic correction for each eye of the user.

The tunable astigmatic lenses 110 and 112 can be implemented using any of the lens structures described herein, including the lens structures illustrated in FIGS. 7A-7D. In some embodiments, an eye tracking system is utilized to determine that the user's eyes have shifted from focusing on a distant object to a close object. In response, the optical properties of the tunable astigmatic lenses 110 and 112 can be modified from a first setting, for example, a prescription for distance viewing, to a second setting, for example, a prescription for reading. Accordingly, glasses that are suitable for implementing different prescriptions, including astigmatism corrections, are provided by embodiments of the present disclosure. Thus, embodiments of the present disclosure provide tunable glasses with controllable prescriptions including spherical optical power and astigmatism.

Figure 2:
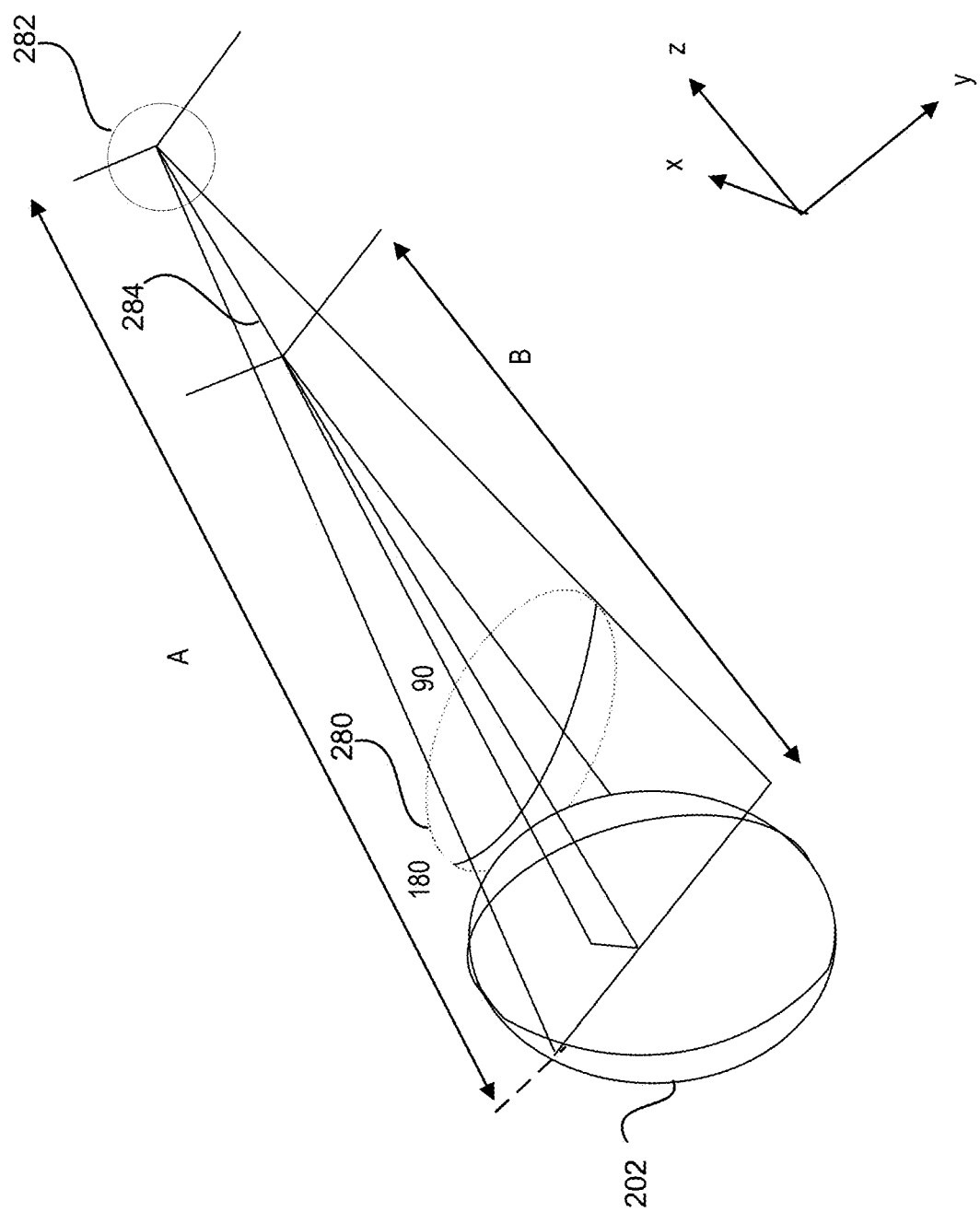
FIG. 2 illustrates a schematic diagram of astigmatism according to an embodiment of the present disclosure.

FIG. 2 illustrates a schematic diagram of astigmatism according to an embodiment of the present disclosure. An eye with astigmatism is characterized by an imperfection in the curvature of a cornea 280. Astigmatism may be corrected using a combination of a spherical lens and a cylindrical lens. The eyeglass prescription is based on how many diopters in front of or behind the retina 282 light is focused by the eye. This is considered the power of astigmatism 284, and is represented on the prescription by a minus (−) or a plus (+). An astigmatism prescription also includes a value associated with the astigmatic axis, referred to as an axis of astigmatism. The value of the axis of astigmatism represents the degree of the angle at which the cylindrical lens is to be placed on a corrective lens to correct the astigmatism. For reference, the axis of astigmatism is measured with respect to vertical meridian of the lens. The axis of astigmatism is a real number between 1 and 180. For example, if the axis of astigmatism is 180, then the eyeglasses include a cylindrical lens placed horizontally.

FIG. 2 shows eyeglasses with a spherical lens 202 placed in front of the eye. With the spherical lens 202, a beam of light aligned with the y-axis will be focused at distance A, while a beam of light aligned with the x-axis will be focused at distance B. The power of astigmatism 284 and the axis of astigmatism may be corrected by adding a cylindrical lens to the eyeglasses, so that a beam of light aligned with the y-axis and a beam of light aligned with the x-axis will both be focused at the retina 282, which is the distance A from the eyeglasses.

Figure 3A:
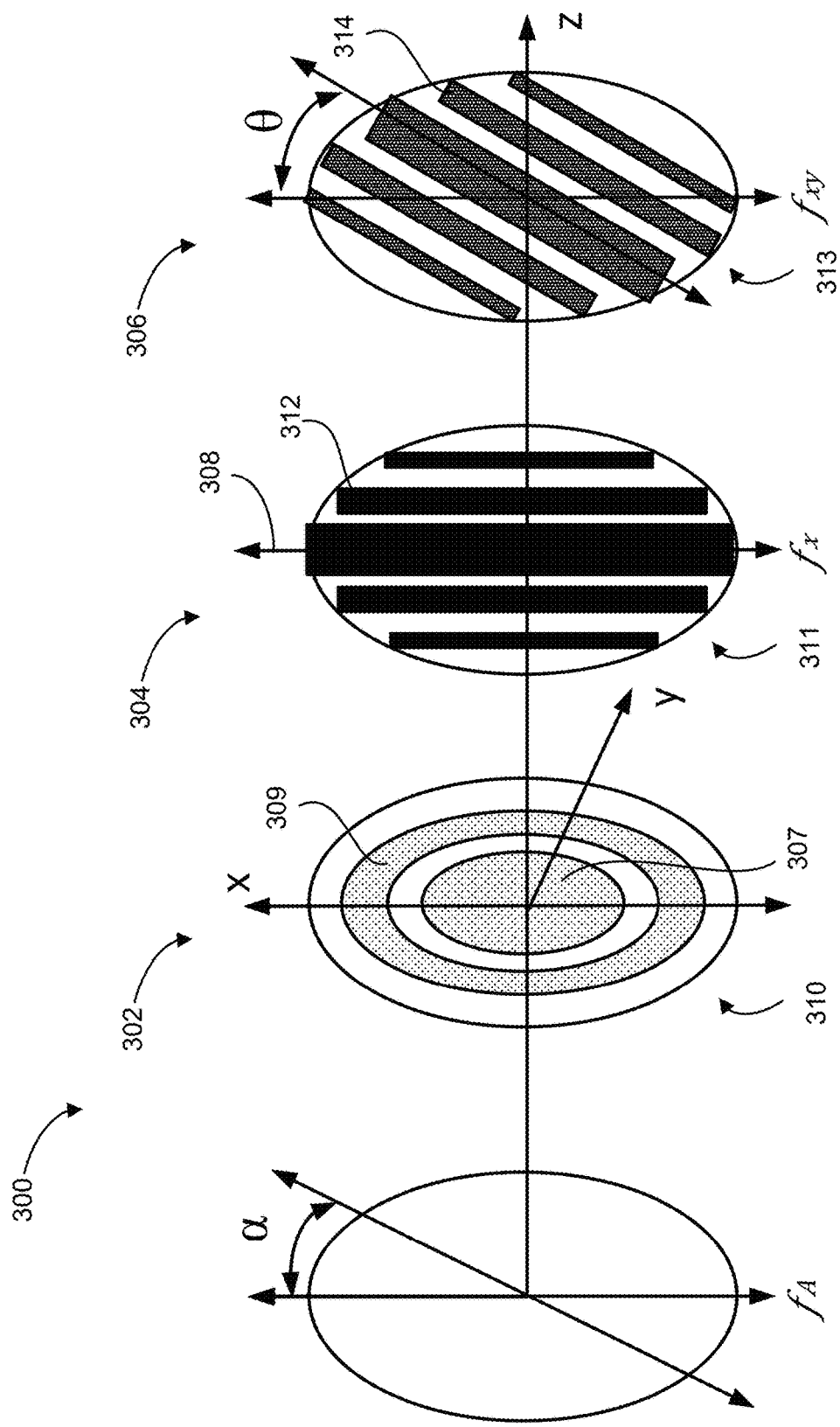
FIG. 3A illustrates a schematic diagram of liquid crystal Fresnel lenses utilized in an astigmatic liquid crystal Fresnel lens according to an embodiment of the present disclosure.

FIG. 3A illustrates a schematic diagram of liquid crystal Fresnel lenses utilized in an astigmatic liquid crystal Fresnel lens according to an embodiment of the present disclosure. The astigmatic liquid crystal Fresnel lens 300 includes a circular liquid crystal Fresnel lens 302, a first cylindrical liquid crystal Fresnel lens 304, and a second cylindrical liquid crystal Fresnel lens 306. The circular liquid crystal Fresnel lens 302, the first cylindrical liquid crystal Fresnel lens 304, and the second cylindrical liquid crystal Fresnel lens 306 illustrated in FIG. 3A utilize a reduced amount of material in comparison with conventional lenses by dividing the refractive surfaces of the Fresnel lens into a set of concentric annular sections. In each section of the liquid crystal Fresnel lens, similar to a conventional Fresnel lens, the curvature of the corresponding original lens surface is maintained, but with stepwise discontinuities between each section. The stepwise discontinuities are designed to introduce an integer number of wavelengths of phase shift at each discontinuity, also referred to as phase wrapping, thereby imitating a continuous refractive surface. In comparison with conventional lenses, the use of a Fresnel lens enables a reduction in lens thickness. Additionally, according to embodiments of the present disclosure, the liquid crystal Fresnel lens enables a tunable focal length as a result of the variable index of refraction of the Fresnel lens structure. By applying a voltage across each of the circular liquid crystal Fresnel lens 302, the first cylindrical liquid crystal Fresnel lens 304, and the second cylindrical liquid crystal Fresnel lens 306, the index of refraction of the astigmatic liquid crystal Fresnel lens 300 can be varied, resulting in a variable (and tunable) focal length lens.

The circular liquid crystal Fresnel lens 302 includes concentric electrodes 310 including center electrode 307 and annular electrode 309, the first cylindrical liquid crystal Fresnel lens 304 includes a first set of linear electrodes 311 including linear electrode 312, and the second cylindrical liquid crystal Fresnel lens 306 includes a second set of linear electrodes 313 including second linear electrode 314. The first set of linear electrodes 311 are aligned with a vertical meridian 308 of the first cylindrical liquid crystal Fresnel lens 304. In FIG. 3A, the vertical meridian 308 is aligned with the x-axis. A power of the first cylindrical liquid crystal Fresnel lens 304 is expressed as $$\frac{1}{f_x}$$

and is based on a voltage applied to the first set of linear electrodes 311. A power of the second cylindrical liquid crystal Fresnel lens 306 is expressed as $$\frac{1}{f_{xy}}$$

and is based on a voltage applied to the second set of linear electrodes 313. The second set of linear electrodes 313 are oriented at an angle θ with respect to the vertical meridian 308. In some embodiments, the second set of linear electrodes 313 are oriented at the angle θ during manufacturing of the second cylindrical liquid crystal Fresnel lens 306. The angle θ with respect to the vertical meridian 308 may be between 0 degrees and 90 degrees, such as 30 degrees, 45 degrees, or 60 degrees. The inventors have determined that at 45 degrees, less power may be needed for the first cylindrical liquid crystal Fresnel lens 304 and the second cylindrical liquid crystal Fresnel lens 306 to correct for a power of astigmatism and an axis of astigmatism, as illustrated by $$\frac{1}{f_A}$$

and α, respectively.

The optical phase associated with an arbitrary power of astigmatism $$\frac{1}{f_A}$$

and axis of astigmatism α is $$e^{-i\frac{\pi(x\cos(\alpha)+y\cos(\alpha))^2}{\lambda f_A}} \quad (1)$$

This astigmatism can be corrected by introduction phase using two cylindrical lenses in which the optical phase associated with the first cylindrical lens is $$e^{-i\frac{\pi y^2}{\lambda f_x}} \quad (2)$$

and the optical phase associated with the second cylindrical lens is:

$$e^{-i\frac{\pi(x\cos(\theta)+y\cos(\theta))^2}{\lambda f_{xy}}} \quad (3)$$

For a given angle θ between the first cylindrical lens and the second cylindrical lens, power of astigmatism $f_A$, and axis of astigmatism α, the power $f_y$ of the first cylindrical liquid crystal Fresnel lens 304 appropriate to correct the power of astigmatism and axis of astigmatism can be expressed by equation 4.

$$f_y = f_A \frac{\sin(2\theta)}{\sin(2(\theta - \alpha))} \quad (4)$$

Additionally, for the given angle θ, power of astigmatism $f_A$, and axis of astigmatism α, the power $f_{xy}$ of the second cylindrical liquid crystal Fresnel lens 306 appropriate to correct the power of astigmatism and the axis of astigmatism can be expressed by equation 5.

$$f_{xy} = f_A \frac{\sin(2\theta)}{\sin(2\alpha)} \quad (5)$$

By supplying a first voltage to the first set of linear electrodes 311 such that the power $f_y$ of the first cylindrical liquid crystal Fresnel lens 304 satisfies equation 4, and a second voltage to the second set of linear electrodes 313 such that the power $f_{xy}$ of the second cylindrical liquid crystal Fresnel lens 306 satisfies equation 5, an astigmatism characterized by the power of astigmatism $f_A$ and the axis of astigmatism α can be corrected.

Although a single set of cylindrical lenses, i.e., first cylindrical liquid crystal Fresnel lens 304 and second cylindrical liquid crystal Fresnel lens 306 are illustrated in FIG. 3A, embodiments of the present disclosure are not limited to the use of only a single set of cylindrical lenses. In other embodiments, in order to increase the astigmatic correction provided, one or more additional sets of cylindrical lenses can be utilized with each set providing a portion of the entire astigmatic correction provided by the multiple sets of cylindrical lenses.

Figure 3B:
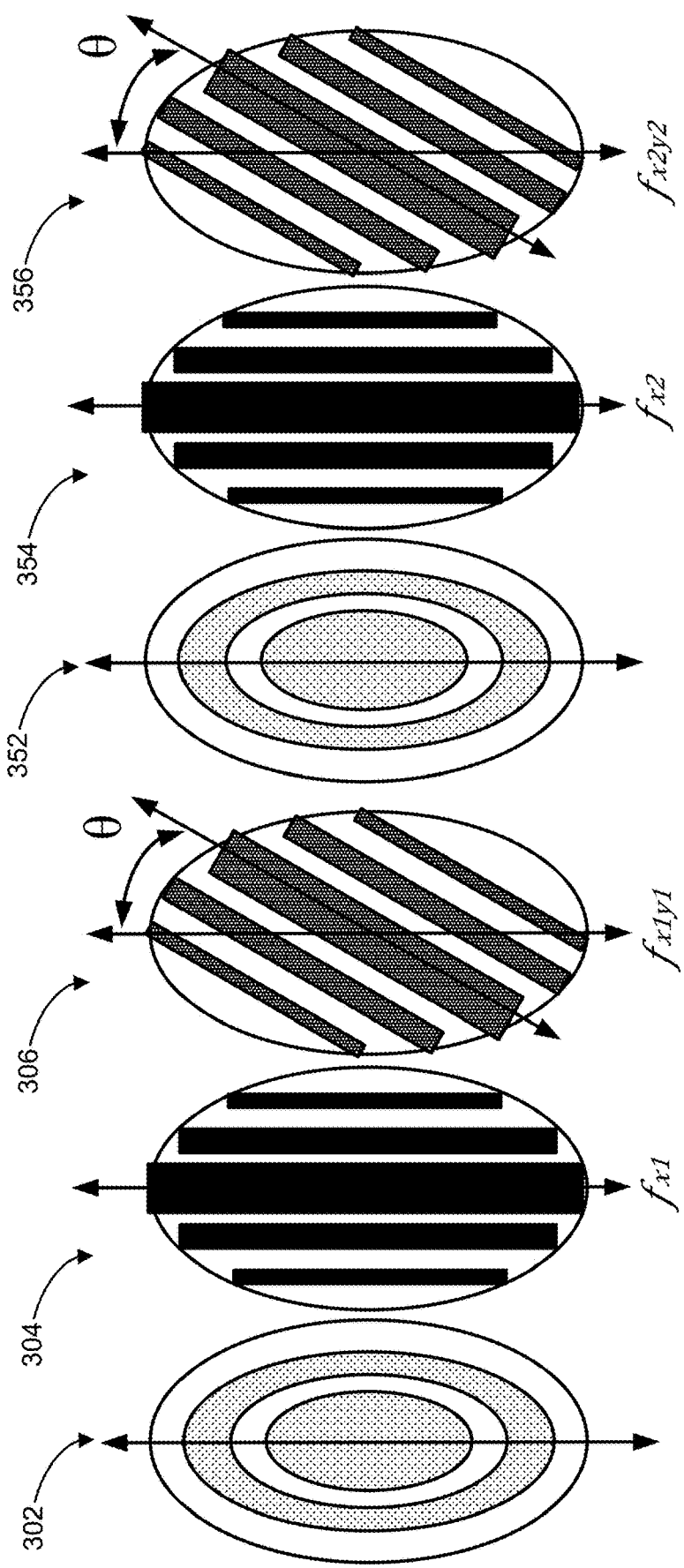
FIG. 3B illustrates a schematic diagram of two sets of liquid crystal Fresnel lenses utilized in an astigmatic liquid crystal Fresnel lens according to an embodiment of the present disclosure.

FIG. 3B illustrates a schematic diagram of two sets of liquid crystal Fresnel lenses utilized in an astigmatic liquid crystal Fresnel lens according to an embodiment of the present disclosure. The astigmatic liquid crystal Fresnel lens illustrated in FIG. 3B is suitable for use with unpolarized light. In FIG. 3B, the circular liquid crystal Fresnel lens 302, the first cylindrical liquid crystal Fresnel lens 304, and the second cylindrical liquid crystal Fresnel lens 306 illustrated in FIG. 3A are utilized with the alignment axis of the liquid crystal materials aligned with a first polarization direction, for example, aligned with the y-axis. Thus, light that is polarized along the y-axis will have a first power of astigmatism and a first angle of astigmatism corrected by the circular liquid crystal Fresnel lens 302, the first cylindrical liquid crystal Fresnel lens 304, and the second cylindrical liquid crystal Fresnel lens 306.

In order to provide astigmatism correction for light polarized along the x-axis, as second set of lenses are provided as illustrated by the second circular liquid crystal Fresnel lens 352, the third cylindrical liquid crystal Fresnel lens 354, and the fourth cylindrical liquid crystal Fresnel lens 356. The second circular liquid crystal Fresnel lens 352, the third cylindrical liquid crystal Fresnel lens 354, and the fourth cylindrical liquid crystal Fresnel lens 356 are utilized with the alignment axis of the liquid crystal materials for these lenses aligned with a second polarization direction orthogonal to the first polarization direction, for example, aligned with the x-axis. Thus, light that is polarized along the x-axis will have a second power of astigmatism and a second angle of astigmatism, which can be the same as the first power of astigmatism and the first angle of astigmatism corrected by the second circular liquid crystal Fresnel lens 352, the third cylindrical liquid crystal Fresnel lens 354, and the fourth cylindrical liquid crystal Fresnel lens 356.

Figure 4B:
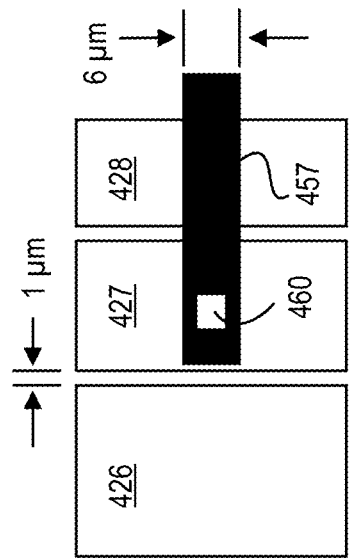
FIG. 4B illustrates a plan view of concentric electrodes illustrated in FIG. 4A, a bus line, and a via providing electrical connectivity between one of the concentric electrodes and the bus line.
Figure 4A:
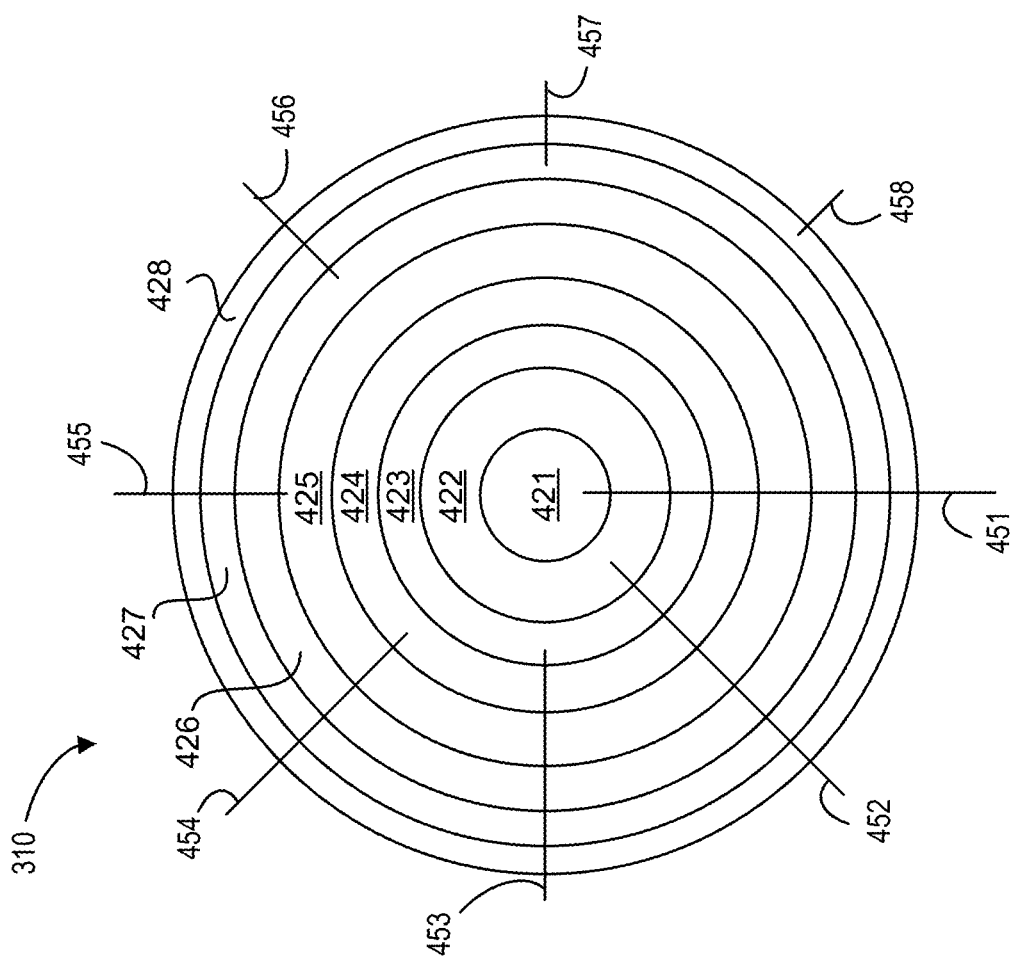
FIG. 4A illustrates a plan view of concentric electrodes for a circular liquid crystal Fresnel lens.

FIG. 4A illustrates a plan view of concentric electrodes for a circular liquid crystal Fresnel lens. Referring to FIG. 4A, the concentric electrodes 310 illustrated in FIG. 3A include a center electrode 421 and a set of seven annular electrodes 422, 423, 424, 425, 426, 427, and 428. It should be noted that the concentric electrodes 310 typically include additional annular electrodes disposed peripherally to the annular electrode 428 that are not illustrated for purposes of clarity. Thus, it will be appreciated that embodiments of the present disclosure are not limited to the precise number of concentric electrodes illustrated in FIG. 4A and other numbers of concentric electrodes in addition to or less than the one center electrode and seven annular electrodes illustrated in FIG. 4A are included within the scope of the present disclosure.

In order to fabricate concentric electrodes 310, photolithography or other suitable printing techniques can be used to deposit the center electrode 421 and the set of seven illustrated annular electrodes 422, 423, 424, 425, 426, 427, and 428 as well as the additional annular electrodes disposed peripherally to the annular electrode 428. In the x-y plane, the center electrode 421 is aligned with a center of the Fresnel lens structure, the annular electrode 422 is aligned with a first concentric annular section surrounding the center of the Fresnel lens structure, and the annular electrode 423 is aligned with a second concentric annular section surrounding the first concentric annular section. Similarly, the annular electrodes 424, 425, 426, 427, and 428, with continuously increasing diameters, are aligned with the corresponding concentric annular sections having continuously increasing diameters. Depending on the application, the width of each of the circular regions of the circular liquid crystal Fresnel lens will be selected as a function of the optical power desired, the overall lens diameter, and the like. Typically, the widths of the regions are on the order of tens of microns to hundreds of microns or millimeters. One of ordinary skill in the art would recognize many variations, modifications, and alternatives.

By applying a voltage between each of the concentric electrodes 421-428 and a common electrode (e.g., common electrode 480 in FIG. 4C), the index of refraction of the liquid crystal material of the Fresnel lens structure can be varied as a function of lateral position. By varying the index of refraction of the liquid crystal material, the focal length of the Fresnel lens can be varied, for example, increased from a focal length of infinity corresponding to an applied voltage of 0 V, to a positive or negative focal length corresponding to a finite applied voltage, depending on the shape of the surface relief pattern.

As an example, by varying the index of refraction in a radial manner, with a higher index of refraction in the central portion of the Fresnel lens structure and a lower index of refraction in the peripheral portion of the Fresnel lens structure (i.e., resulting from higher voltages applied to centrally located concentric electrodes than applied to more peripherally located concentric electrodes), the lensing effect can result in a predetermined focal length for the liquid crystal Fresnel lens. In this example, with a higher index of refraction in the central portion of the Fresnel lens structure, a positive lens is formed that is characterized by a predetermined focal length. Phase wrapping can be implemented at the intersection between adjacent concentric electrodes to provide suitable optical power.

In another example, the voltage between the concentric electrodes and the common electrode can be lower at the center than at the periphery, resulting in a lower index of refraction in the central portion of the Fresnel lens structure and a higher index of refraction in the peripheral portion of the Fresnel lens structure, thereby producing a negative lens characterized by a predetermined negative focal length.

Thus, embodiments of the present disclosure utilize concentric and rotationally symmetric transparent electrodes, for example, fabricated using ITO, that are formed on a substrate. As an example, photolithographic techniques can be utilized to pattern the transparent electrodes on a glass substrate. In order to provide for electrical connectivity to the center electrode 421 and the set of seven illustrated annular electrodes 422, 423, 424, 425, 426, 427, and 428, a set of bus lines are electrically connected to each of the transparent electrodes. As illustrated in FIG. 4A, a bus line 451 provides electrical connection between drive electronics (not shown) and the center electrode 421. For the annular electrodes, a bus line 452 provides electrical connection to the annular electrode 422, a bus line 453 provides electrical connection to the annular electrode 423, a bus line 454 provides electrical connection to the annular electrode 424, a bus line 455 provides electrical connection to the annular electrode 425, a bus line 456 provides electrical connection to the annular electrode 426, a bus line 457 provides electrical connection to the annular electrode 427, and a bus line 458 provides electrical connection to the annular electrode 428.

Thus, in this embodiment of the present disclosure, each transparent electrode can be operated at an independent voltage with respect to the other transparent electrodes. In some embodiments, rather than providing separate and independent electrical connections to each transparent electrode, one or more transparent electrodes can be electrically connected to a single bus line. As an example, the annular electrodes 422, 423, and 424, because they have a larger annular width than the annular electrodes 425, 426, 427, and 428, could be connected to independent bus lines. However, because of their smaller annular width, the annular electrodes 425 and 426 could be connected to a single bus line and the annular electrodes 427 and 428 could be connected to another bus line. As a result, using only five bus lines, electrical connection can be provided to seven transparent electrodes. One of ordinary skill in the art would recognize many variations, modifications, and alternatives.

FIG. 4B illustrates a plan view of concentric electrodes illustrated in FIG. 4A, a bus line, and a via providing electrical connectivity between one of the concentric electrodes and the bus line. As discussed in relation to FIG. 4A, independent electrical connectivity can be provided to each of the transparent electrodes in some embodiments, whereas in other embodiments, multiple transparent electrodes could be electrically connected to a single bus line. The plan view shown in FIG. 4B illustrates a structure suitable for use in providing separate and independent electrical connections to the transparent electrodes.

Referring to FIG. 4B, the annular electrodes 426, 427, and 428 are illustrated. Bus line 457 is also shown in this plan view. A via 460 is provided in an electrically insulating layer (not shown in FIG. 4B, but illustrated in FIG. 4C) to provide for electrical contact between the annular electrode 427 and the bus line 457. Using this structure, a voltage applied to the bus line 457 can be present at the annular electrode 427 without making electrical contact with either the annular electrode 426 or the annular electrode 428. Thus, as illustrated in FIG. 4A, utilizing both concentric electrodes (i.e., transparent electrodes) and bus lines, which can also be referred to as linear electrodes, independent voltages can be established at each of the concentric electrodes. In some embodiments, the spacing between the center electrode and the first annular electrode and the annular electrodes and adjacent annular electrodes can be on the order of 1 µm, the width of the bus lines can be on the order of 6 µm, and the dimensions of the via can be on the order of 3 µm by 3 µm. In other embodiments, these specific values can be adjusted depending on the particular application.

Figure 4C:
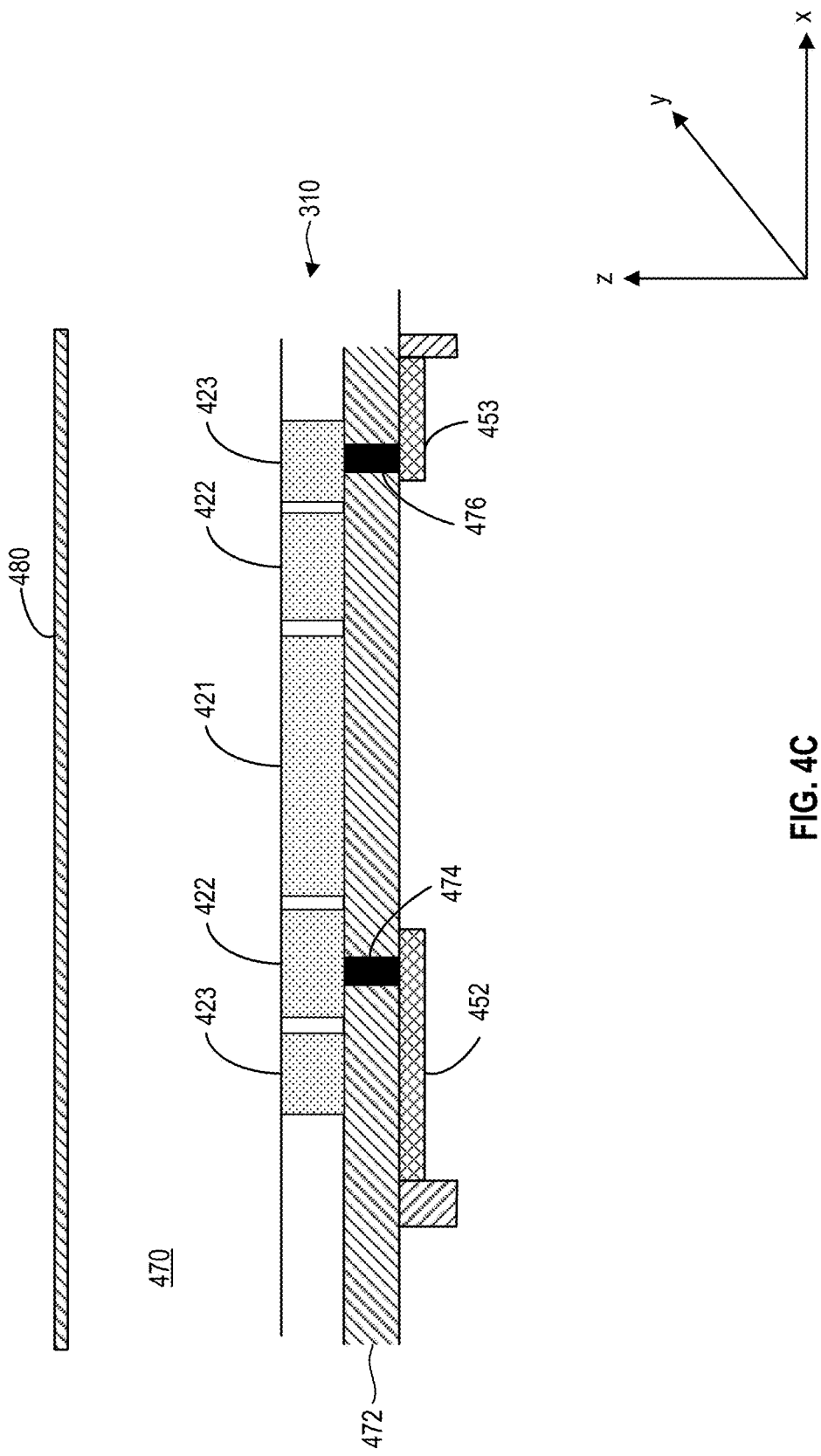
FIG. 4C illustrates a cross section view of a portion of the circular liquid crystal Fresnel lens illustrated in FIG. 3A.

FIG. 4C illustrates a cross section view of a portion of the circular liquid crystal Fresnel lens 302 illustrated in FIG. 3A. For purposes of clarity, only the central portion of the circular liquid crystal Fresnel lens 302 is illustrated, but it will be appreciated that the electrical and optical structures illustrated in FIG. 4C will be applicable to other portions of the circular liquid crystal Fresnel lens 302. Substrates supporting structures illustrated in FIG. 4C are not illustrated for purposes of clarity, but will contain the liquid crystal material and form a housing defined by a predetermined index of refraction.

Referring to FIG. 4C, a liquid crystal material 470 is sandwiched between a common electrode 480 and concentric electrodes 310. A variety of liquid crystal materials can be utilized according to embodiments of the present disclosure, including nematic liquid crystals, smectic liquid crystals, cholesteric phase forming liquid crystals or the like. Additionally, liquid crystals including polymers can also be utilized, for example, polymer liquid crystals, polymer dispersed liquid crystals, or liquid crystals stabilized by polymers. The liquid crystal material 470 is in electrical communication with common electrode 480 and concentric electrodes 310. Depending on the geometry and dimensions of the common electrode 480, suitable deposition methods can be utilized, including screen printing, photolithographic processes, or the like. In order to maintain high levels of transparency for the circular liquid crystal Fresnel lens, the common electrode 480 is fabricated using substantially transparent, electrically conductive materials. For example, the common electrode 480 can be fabricated using one or more of a variety of transparent conductive oxides including indium tin oxide, fluorine doped tin oxide, indium oxide, doped zinc oxide, or the like. The thickness of the common electrode 480 can be selected depending on the particular application, and generally have thicknesses in the range of several hundred Angstroms, for example, 1,000 Å.

A Fresnel lens is formed by varying the index of refraction as a function of lateral position, i.e., the x-y plane. Portions of concentric electrodes 310 are illustrated by the center electrode 421, which is surrounded by the annular electrode 422, which, in turn, is surrounded by the annular electrode 423. In this embodiment, the liquid crystal material 470 has a uniform thickness as a function of lateral position (i.e., the x-y plane). In other embodiments, the liquid crystal material 470 can have a variation in layer thickness in the lateral plane to form additional Fresnel sections as appropriate to the particular application. Thus, in this embodiment, the Fresnel lens structure is formed as a result of variation in index of refraction of the liquid crystal material 470 resulting from variation in the applied voltage as a function of lateral position (i.e., in this embodiment, radial position extending in the x-y plane).

As illustrated in FIG. 4C, an electrically insulating layer 472 is disposed between concentric electrodes 310 and the bus line 452 and the bus line 453. In order to provide for electrical connection between the bus line 452 and the annular electrode 422, a via 474 is formed passing through the electrically insulating layer 472 from the bus line 452 to the annular electrode 422. As a result, although the bus line 452 passes over the annular electrode 423, there is no electrical connection between the bus line 452 and the annular electrode 423. Similarly, the other annular electrodes illustrated in FIG. 4A that are peripheral to the annular electrode 422 are electrically isolated from the bus line 452 by the presence of the electrically insulating layer 472.

In order to provide an independent voltage to the annular electrode 423, a via 476 is formed passing through the electrically insulating layer 472 from the bus line 453 to the annular electrode 423. Although not illustrated in FIG. 4C, similar bus lines and vias can be utilized to provide independent voltages to each of the concentric transparent electrodes. Accordingly, referring to both FIGS. 4A and 4C, the structure of the tunable liquid crystal Fresnel lens is apparent, with concentric electrodes formed adjacent the liquid crystal material 470. Application of independent voltages to the concentric electrodes enables the index of refraction of the liquid crystal material 470 to be varied in the lateral direction (i.e., in the x-y plane), resulting in a Fresnel lens that has a tunable and controllable focal length. Each of the annular electrodes can be electrically connected to one of a set of independent voltage sources, which are not shown in FIG. 4C for purposes of clarity, which provides a set of independent voltages that can also be referred to as a set of independent voltage signals.

Although common electrode 480 is illustrated in FIG. 4C as being planar, in other embodiments, a surface relief pattern could be utilized in conjunction with the structure shown in FIG. 4C.

Although the focal length of the liquid crystal Fresnel lens can be controlled to provide a predetermined spherical optical power, the lens illustrated in FIG. 4C does not provide for different focal lengths along the x-axis and the y-axis. In other words, the liquid crystal Fresnel lens does not enable astigmatic tunability. Additionally, in some embodiments, the optical power of the liquid crystal Fresnel lens illustrated in FIG. 4C may be limited and not high enough for some applications. In some applications, for example, in dual-mode reading glasses that can be operated in a focus-free mode in which the lenses have no optical power and in a focus mode in which the lenses have a predetermined optical power, it would be beneficial to not only provide electrically controllable optical power, but astigmatism correction for the user. Thus, dual-mode reading glasses that can provide for astigmatic imaging are desirable.

According to embodiments of the present disclosure, a tunable, astigmatic liquid crystal Fresnel lens is provided that provides adjustable focal length combined with astigmatic imaging that can provide for astigmatism correction for the user. Using these astigmatic, dual-mode reading glasses, a user could operate the glasses in a first mode, with no electrical power applied to the glasses. In this mode, the glasses would not have any optical power, but would not consume any electrical power. In a second mode, the focal length of the lenses in the glasses could be adjusted to provide, not only spherical optical power, but astigmatic imaging, resulting in a different focal length along different directions. As described herein, the orientation of the astigmatic axis, or the axis of astigmatism, can be controlled to correct for a range of astigmatic errors in the user's vision.

Figure 5A:
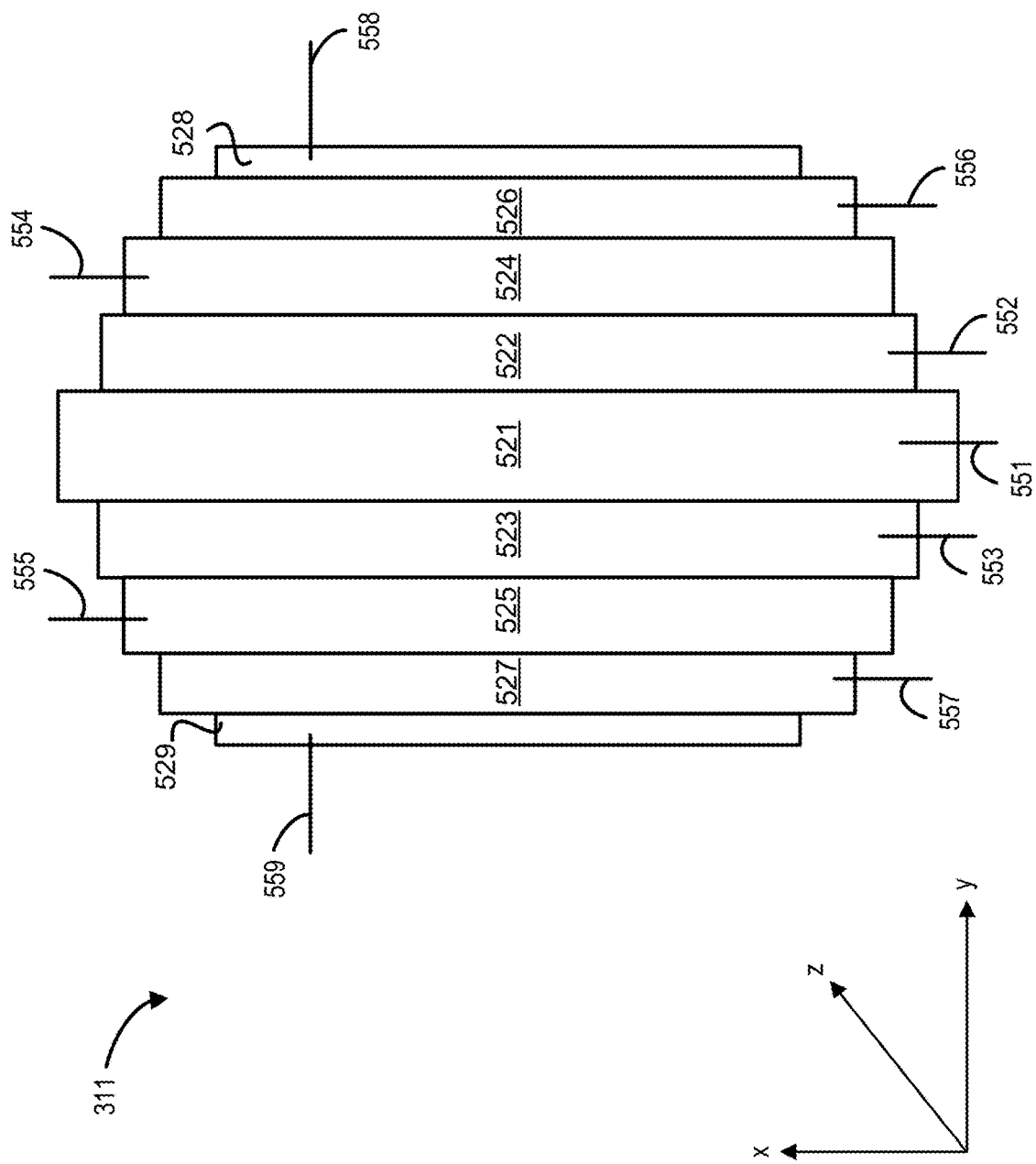
FIG. 5A illustrates a plan view of linear electrodes utilized in a cylindrical liquid crystal Fresnel lens including linear electrodes according to an embodiment of the present disclosure.

FIG. 5A illustrates a plan view of linear electrodes utilized in a cylindrical liquid crystal Fresnel lens including linear electrodes according to an embodiment of the present disclosure. In a manner similar to the concentric electrodes 310 illustrated in FIGS. 3 and 4A, linear electrodes 311 (i.e., transparent conductive electrodes) are an implementation of distributed electrodes that are distributed in a linear configuration adjacent the liquid crystal material. Referring to FIG. 5A, the linear electrodes 311 include a central electrode 521 and a set of eight outer electrodes 522, 523, 524, 525, 526, 527, 528, and 529. It should be noted that the linear electrodes 311 typically include additional linear electrodes disposed peripherally to the peripheral outer electrodes 528 and 529 that are not illustrated for purposes of clarity. Thus, it will be appreciated that embodiments of the present disclosure are not limited to the precise number of linear electrodes illustrated in FIG. 5A and other numbers of linear electrodes in addition to or less than the one center electrode and eight outer electrodes illustrated in FIG. 5A are included within the scope of the present disclosure. It will be noted that the linear electrodes 311 are electrically insulated from each other so that they are individually addressable, for example, by the use of resistive dividers between adjacent electrodes. Similar resistive dividers can be utilized in conjunction with concentric electrodes 310 illustrated in FIG. 4A.

In order to fabricate linear electrodes 311, photolithography or other suitable printing techniques can be used to deposit the central electrode 521 and the set of eight illustrated outer electrodes 522, 523, 524, 525, 526, 527, 528, and 529 as well as the additional outer electrodes disposed peripherally to the peripheral outer electrodes 528 and 529. In the x-y plane, the central electrode 521 is aligned with a vertical meridian of the Fresnel lens structure, the central outer electrodes 522 and 523 are aligned with first linear sections adjacent to the vertical meridian of the Fresnel lens structure, and the intermediate outer electrodes 524 and 525 are aligned with second linear sections surrounding the first linear sections. Depending on the application, the width of each of the linear regions of the cylindrical liquid crystal Fresnel lens will be selected as a function of the optical power desired, the overall lens diameter, and the like. Typically, the widths of the regions are on the order of tens of microns to hundreds of microns or millimeters. One of ordinary skill in the art would recognize many variations, modifications, and alternatives.

The linear electrodes 311 are implemented as nine electrodes in the embodiment illustrated in FIG. 5A, but this is not required by the present disclosure. In other embodiments, a larger or smaller number of linear electrodes are utilized, including linear electrodes of differing dimensions. As an example, since, in a Fresnel lens, the Fresnel sections decrease in size with increasing radius, the linear electrodes in the central portion of the Fresnel lens could be larger in size compared to the linear electrodes in the peripheral portion of the Fresnel lens, as illustrated in FIG. 5A. However, the linear electrodes illustrated in FIG. 5A are merely exemplary and are not intended to limit the scope of the embodiments described in the present disclosure. Depending on the geometrical arrangement and the number of the linear electrodes 311, different techniques can be used to drive the linear electrodes 311, including direct drive, active matrix techniques including drive transistors, or the like. For purposes of clarity, independent voltage sources that can be connected to each of the linear electrodes, or to sets of linear electrodes, are not illustrated in FIG. 5A. However, one of skill in the art will appreciate that a multi-output driver providing independent voltage sources can be utilized in conjunction with linear electrodes 311 as illustrated in FIG. 5A to provide an independent voltage to each of the linear electrodes or sets of linear electrodes.

In order to fabricate linear electrodes 311, photolithography or other suitable printing techniques can be used to deposit electrodes including central and outer electrodes 521-529. The linear electrodes 311, or sets of the linear electrodes, can each be electrically connected to one of a set of independent voltage sources, which are not shown in FIG. 5A for purposes of clarity, but may be a multi-output driver, which provides a set of independent voltages that can also be referred to as a set of independent voltage signals.

The central electrode 521 and central outer electrodes 522 and 523 above correspond generally to the central region of the cylindrical Fresnel lens and can be controlled to operate at independent voltages or a common voltage. As illustrated in FIGS. 5A, central electrode 521 and central outer electrodes 522 and 523, which are positioned in the central region of the cylindrical Fresnel lens, at least partially overlap in the lateral plane with central electrode 521. The intermediate outer electrodes 524 and 525 constitute electrodes that are peripheral to the central electrode 521 and central outer electrodes 522 and 523, but are positioned closer to the central region of the Fresnel lens than the electrodes that are positioned peripherally to the intermediate outer electrodes 524 and 525. Using the linear electrodes 311, the voltage applied to the liquid crystal material can be varied as a function of lateral position, providing a controllable cylindrical optical power.

Referring once again to FIG. 5A, by applying a voltage between each of the linear electrodes and the common electrode (not shown), the index of refraction of the liquid crystal material of the astigmatic liquid crystal Fresnel lens can be varied. By varying the index of refraction with a higher index of refraction in the central portion of the astigmatic liquid crystal Fresnel lens, generally corresponding to the voltage applied to central electrode 521 and central outer electrodes 522 and 523, and a lower index of refraction in the peripheral portion of the astigmatic liquid crystal Fresnel lens, a lensing effect can be implemented, resulting in a predetermined focal length for the astigmatic liquid crystal Fresnel lens 300 shown in FIG. 3A. In this example, with a higher index of refraction in the central portion of the astigmatic liquid crystal Fresnel lens, a positive lens is formed that is characterized by a predetermined focal length. Phase wrapping can be implemented at the intersection between adjacent linear electrodes to provide suitable optical power.

In contrast with the embodiment illustrated in FIG. 4A, a cylindrical liquid crystal Fresnel lens utilizing the linear electrodes 311 illustrated in FIG. 5A also provides astigmatic optical properties as described more fully below.

In order to provide for electrical connectivity to the central electrode 521 and the set of eight illustrated outer electrodes 522, 523, 524, 525, 526, 527, 528, and 529, a set of bus lines are electrically connected to each of the transparent electrodes. As illustrated in FIG. 5A, a bus line 551 provides electrical connection between drive electronics (not shown) and the central electrode 521. For the outer electrodes, a bus line 552 provides electrical connection to the central outer electrode 522, a bus line 553 provides electrical connection to the central outer electrode 523, a bus line 554 provides electrical connection to the intermediate outer electrode 524, a bus line 555 provides electrical connection to the intermediate outer electrode 525, a bus line 556 provides electrical connection to the outer electrode 526, a bus line 557 provides electrical connection to the outer electrode 527, a bus line 558 provides electrical connection to the peripheral outer electrode 528, and a bus line 559 provides electrical connection to the peripheral outer electrode 529. In this embodiment of the present disclosure, each transparent electrode can be operated at an independent voltage with respect to the other transparent electrodes. In some embodiments, rather than providing separate and independent electrical connections to each transparent electrode, one or more transparent electrodes can be electrically connected to a single bus line.

Figure 5B:
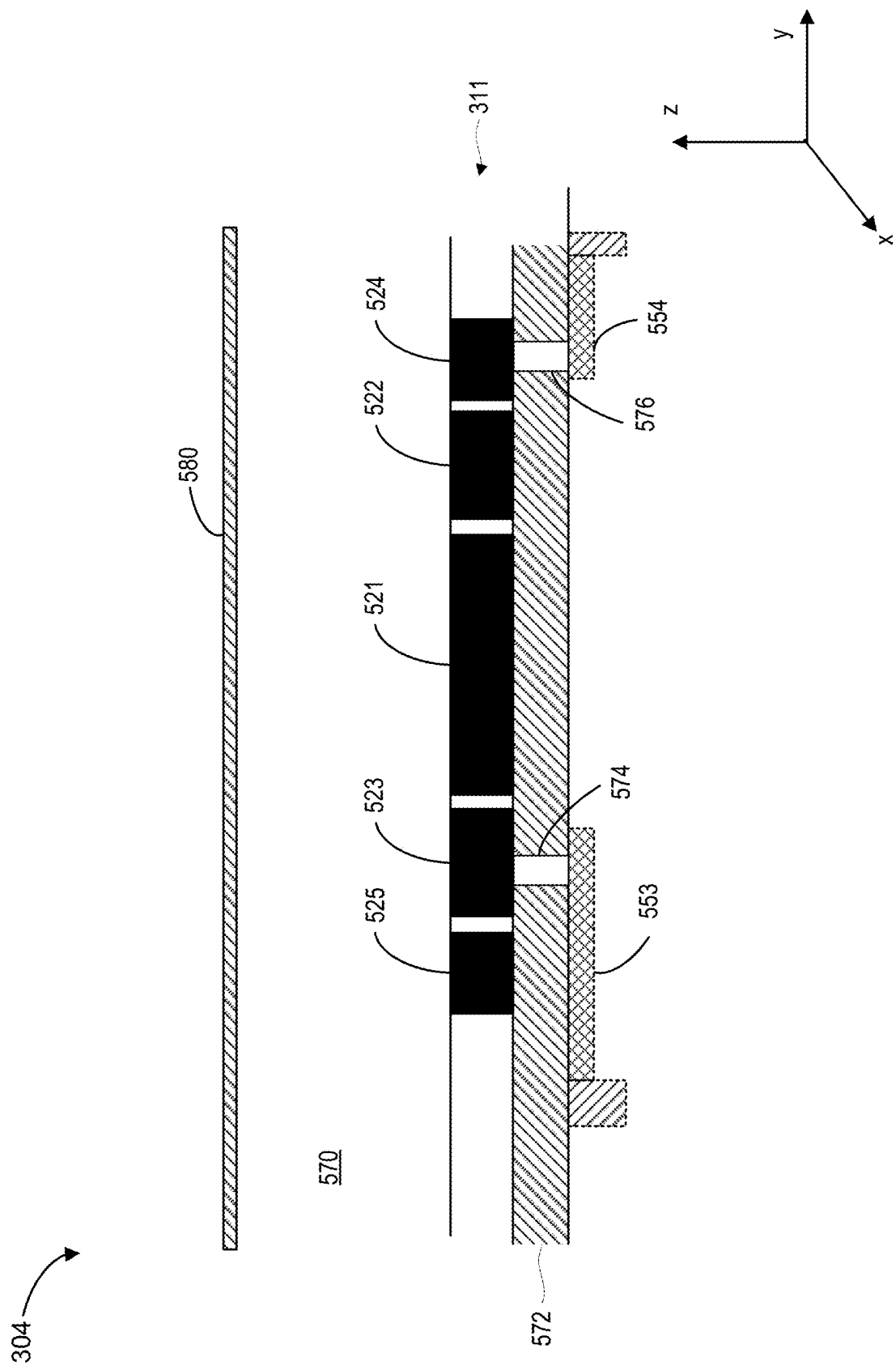
FIG. 5B illustrates a cross section view of a portion of the first cylindrical liquid crystal Fresnel lens illustrated in FIG. 3A.

FIG. 5B illustrates a cross section view of a portion of the first cylindrical liquid crystal Fresnel lens 304 illustrated in FIG. 3A. For purposes of clarity, only the central portion of the first cylindrical liquid crystal Fresnel lens 304 is illustrated, but it will be appreciated that the electrical and optical structures will be applicable to other portions of the first cylindrical liquid crystal Fresnel lens 304. Substrates supporting structures are not illustrated for purposes of clarity, but will contain the liquid crystal material and form a housing defined by a predetermined index of refraction.

Referring to FIG. 5B, a liquid crystal material 570 is sandwiched between a common electrode 580 and linear electrodes 311. The liquid crystal material 570 is in electrical communication with common electrode 580 and linear electrodes 311. A Fresnel lens is formed by varying the index of refraction as a function of lateral position, i.e., the x-y plane. Portions of linear electrodes 311 are illustrated by the central electrode 521, which is surrounded by the central outer electrodes 522 and 523 on either side, which, in turn, are surrounded by the intermediate outer electrodes 524 and 525, respectively. In this embodiment, the liquid crystal material 570 has a uniform thickness as a function of lateral position (i.e., the x-y plane). In other embodiments, the liquid crystal material 570 can have a variation in layer thickness in the lateral plane to form additional Fresnel sections as appropriate to the particular application. Thus, in this embodiment, the Fresnel lens structure is formed as a result of variation in index of refraction of the liquid crystal material 570 resulting from variation in the applied voltage as a function of lateral position (i.e., in this embodiment, radial position extending in the x-y plane).

As illustrated in FIG. 5B, an electrically insulating layer 572 is disposed between linear electrodes 311 and the bus line 553 and the bus line 554. In order to provide for electrical connection between the bus line 553 and the central outer electrode 523, a via 574 is formed passing through the electrically insulating layer 572 from the bus line 553 to the central outer electrode 523. As a result, although the bus line 553 passes over the intermediate outer electrode 525, there is no electrical connection between the bus line 553 and the intermediate outer electrode 525. Similarly, the other linear electrodes illustrated in FIG. 5A that are peripheral to the central outer electrode 523 are electrically isolated from the bus line 553 by the presence of the electrically insulating layer 572.

In order to provide an independent voltage to the intermediate outer electrode 524, a via 576 is formed passing through the electrically insulating layer 572 from the bus line 554 to the intermediate outer electrode 524. Although not illustrated in FIG. 5B, similar bus lines and vias can be utilized to provide independent voltages to each of the linear transparent electrodes. Accordingly, referring to FIG. 5B, the structure of the electrode pattern of the tunable, cylindrical liquid crystal Fresnel lens is apparent, with linear electrodes 311 formed adjacent the liquid crystal material 570. Application of independent voltages to the linear electrodes 311 enables the index of refraction of the liquid crystal material 570 to be varied in the lateral direction (i.e., in the x-y plane), resulting in a cylindrical Fresnel lens that has a tunable and controllable focal length. Each of the linear electrodes can be electrically connected to one of a set of independent voltage sources, which are not shown in FIG. 5B for purposes of clarity, which provides a set of independent voltages that can also be referred to as a set of independent voltage signals.

Although common electrode 580 is illustrated in FIG. 5B as being planar, in other embodiments, a surface relief pattern could be utilized in conjunction with the structure shown in FIG. 5B.

Figure 6A:
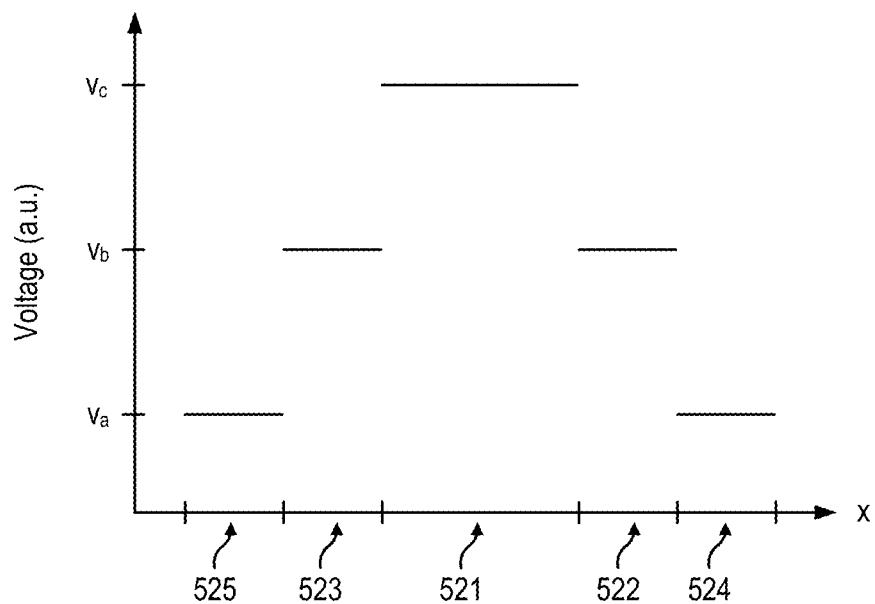
FIG. 6A is a plot illustrating application of voltage as a function of position to form a cylindrical lens according to an embodiment of the present disclosure.

FIG. 6A is a plot illustrating application of voltage as a function of position to form a cylindrical lens according to an embodiment of the present disclosure. In FIG. 6A, the voltage present at each of the linear electrodes 311 illustrated in FIG. 5B is shown in arbitrary units. The voltage present at the central electrodes 521 is $V_c$, the voltage present at the central outer electrodes 522 and 523 is $V_b$, and the voltage present at the intermediate outer electrodes 524 and 525 is $V_a$. In this implementation, the voltage at the linear electrodes in the columns including the illustrated electrodes would be uniform, providing for a voltage variation along the x-axis, but a uniform voltage for each column oriented along the y-axis.

The application of the varying voltage along the x-axis will result in a variation in the index of refraction of the liquid crystal material along the x-axis in response to the voltage variation.

Figure 6B:
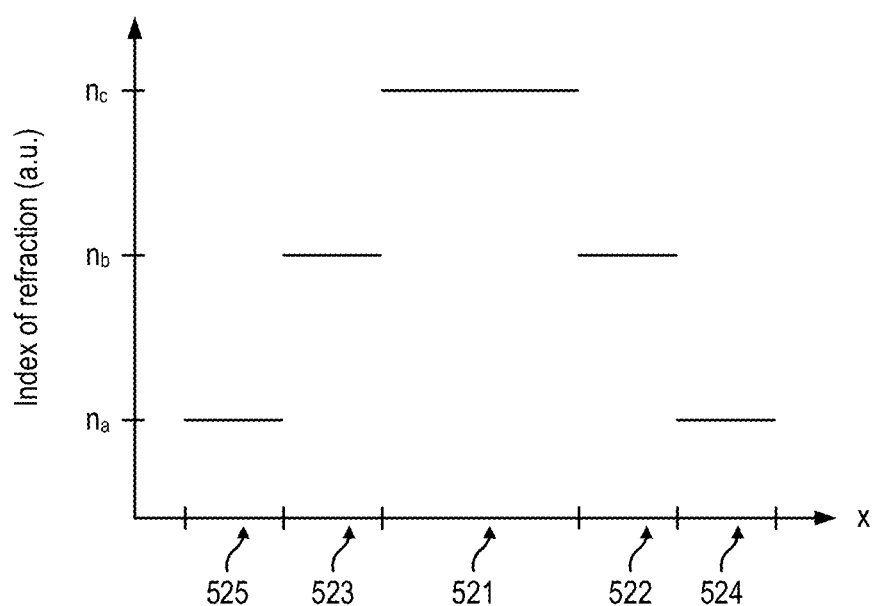
FIG. 6B is a plot illustrating index of refraction as a function of position forming a cylindrical lens according to an embodiment of the present disclosure.

FIG. 6B is a plot illustrating index of refraction as a function of position forming a cylindrical lens according to an embodiment of the present disclosure. As illustrated in FIG. 6B, the index of refraction corresponding to each of the illustrated linear electrodes varies as a function of lateral position. In FIG. 6B, the index of refraction corresponding to each of the linear electrodes 311 illustrated in FIG. 5B is shown in arbitrary units. The index of refraction corresponding to the central electrode 521 is $n_c$, the index of refraction corresponding to the central outer electrodes 522 and 523 is $n_b$, and the index of refraction corresponding to the intermediate outer electrodes 524 and 525 is $n_a$. In this implementation, the index of refraction corresponding to the linear electrodes in the columns including the illustrated electrodes would be uniform, providing for a variation in index of refraction along the x-axis, but a uniform index of refraction profile for each column oriented along the y-axis. As a result of this index of refraction variation along the x-axis, the liquid crystal Fresnel lens will form a positive cylindrical lens forming a focal line parallel to the y-axis.

FIG. 7A illustrates a cross section view of a portion of an astigmatic liquid crystal Fresnel lens 300 according to an embodiment of the present disclosure. For purposes of clarity, only the central portion of the astigmatic liquid crystal Fresnel lens 300 is illustrated, but it will be appreciated that the electrical and optical structures illustrated in FIGS. 4C and 5B will be applicable to other portions of the astigmatic liquid crystal Fresnel lens 300. The astigmatic liquid crystal Fresnel lens 300 includes a circular liquid crystal Fresnel lens 302 having a set of concentric electrodes 310, a first cylindrical liquid crystal Fresnel lens 304 having a first set of linear electrodes 311, and a second cylindrical liquid crystal Fresnel lens 306 having a second set of linear electrodes 313. The first set of linear electrodes 311 are aligned with a vertical meridian of the first cylindrical liquid crystal Fresnel lens 304, as illustrated in FIG. 3A. The second set of linear electrodes 313 are positioned at an angle θ with respect to the vertical meridian of the first cylindrical liquid crystal Fresnel lens 304. For example, the second set of linear electrodes 313 may be positioned at an angle between 0 degrees and 90 degrees, such as 45 degrees, with respect to the vertical meridian.

The concentric electrodes 310 are deposited or otherwise disposed on a first substrate 762, the first set of linear electrodes 311 are deposited or otherwise disposed on a second substrate 764, and the second set of linear electrodes 313 are deposited or otherwise disposed on a third substrate 766. The first substrate 762, the second substrate 764, and the third substrate 766 are generally planar, although, as described more fully below, one or more surfaces of the first substrate 762, the second substrate 764, and/or the third substrate 766 may have non-planar features. The first substrate 762, the second substrate 764, and the third substrate 766 can be fabricated using a variety of materials that provide mechanical rigidity to support the Fresnel lens structure, electrodes, and the like. As an example, the first substrate 762, the second substrate 764, and the third substrate 766 can be fabricated using polymers characterized by light weight and high transparency, glass, and combinations thereof. One or more optical coatings, for example, anti-reflection coatings, scratch resistant coatings, and the like, can be deposited or otherwise adhered to the first substrate 762, the second substrate 764, and/or the third substrate 766 during manufacturing or once the astigmatic liquid crystal Fresnel lens has been assembled.

A first liquid crystal material 470a, which can also be referred to as a first liquid crystal material layer, is sandwiched between a first common electrode 481 and concentric electrodes 310. The first liquid crystal material 470a is in electrical communication with first common electrode 481 and concentric electrodes 310. The circular liquid crystal Fresnel lens 302 is formed by varying the index of refraction as a function of lateral position, i.e., the x-y plane. Portions of concentric electrodes 310 are illustrated by the center electrode 421, which is surrounded by the annular electrode 422, which, in turn, is surrounded by the annular electrode 423. In this embodiment, the liquid crystal material 470a has a uniform thickness as a function of lateral position (i.e., the x-y plane). In other embodiments, the first liquid crystal material 470a can have a variation in layer thickness in the lateral plane to form additional Fresnel sections as appropriate to the particular application. Thus, in this embodiment, the Fresnel lens structure is formed as a result of variation in index of refraction of the first liquid crystal material 470a resulting from variation in the applied voltage as a function of lateral position (i.e., in this embodiment, radial position extending in the x-y plane).

A second liquid crystal material 470b is positioned between a second common electrode 482, which can be attached to the first substrate 762 supporting the concentric electrodes 310 of the circular liquid crystal Fresnel lens 302, and linear electrodes 311 of the first cylindrical liquid crystal Fresnel lens 304. In the embodiment illustrated in FIG. 7A, concentric electrodes 310 are positioned facing away from the first set of linear electrodes 311. The second liquid crystal material 470b is in electrical communication with the second common electrode 482 and the first set of linear electrodes 311. A Fresnel lens is formed by varying the index of refraction as a function of lateral position. Portions of the first set of linear electrodes 311 are illustrated by linear electrodes including central electrode 521, central outer electrodes 522 and 523, and intermediate outer electrodes 524 and 525. In this embodiment, the second liquid crystal material 470b has a uniform thickness as a function of lateral position (i.e., the x-y plane). In other embodiments the second liquid crystal material 470b can have a variation in layer thickness in the lateral plane to form additional Fresnel sections as appropriate to the particular application. Thus, in this embodiment, the lensing effect is formed as a result of variation in index of refraction of the second liquid crystal material 470b resulting from variation in the applied voltage as a function of lateral position.

A third liquid crystal material 470c is positioned between a third common electrode 483, which can be attached to the second substrate 764 supporting the first set of linear electrodes 311 of the first cylindrical liquid crystal Fresnel lens 304, and second set of linear electrodes 313 of the second cylindrical liquid crystal Fresnel lens 306. In the embodiment illustrated in FIG. 7A, the first set of linear electrodes 311 are positioned facing away from the second set of linear electrodes 313. The third liquid crystal material 470c is in electrical communication with the third common electrode 483 and the second set of linear electrodes 313. A Fresnel lens is formed by varying the index of refraction as a function of lateral position. Portions of the second set of linear electrodes 313 are illustrated by linear electrodes including central electrode 721 and peripheral electrodes 722 and 723. In this embodiment, the third liquid crystal material 470c has a uniform thickness as a function of lateral position (i.e., the x-y plane). In other embodiments the third liquid crystal material 470c can have a variation in layer thickness in the lateral plane to form additional Fresnel sections as appropriate to the particular application. Thus, in this embodiment, the lensing effect is formed as a result of variation in index of refraction of the third liquid crystal material 470c resulting from variation in the applied voltage as a function of lateral position.

In operation, voltages can be applied to either the first set of linear electrodes 311, the second set of linear electrodes 313, the concentric electrodes 310, or any combination thereof Thus, the structure of the tunable, astigmatic liquid crystal Fresnel lens 300 is apparent in this embodiment, with the linear electrodes and the concentric electrodes being able to be operated in a combined manner. Given an angle θ, a power of astigmatism, and an axis of astigmatism, voltages for correcting the astigmatism can be determined for the first cylindrical liquid crystal Fresnel lens 304 and the second cylindrical liquid crystal Fresnel lens 306. Thus, in applications, for example, in dual-mode reading glasses that can be operated in a focus-free mode and in a focus mode, the embodiment illustrated in FIG. 7A can provide electrically controllable optical power including astigmatism correction for the user. Each of the linear electrodes can be electrically connected to one of a set of independent voltage sources and each of the concentric electrodes can be electrically connected to one of a second set of independent voltage sources.

Depending on the specific spherical optical power and astigmatism utilized in a particular application, the combination of the spherical optical power resulting from application of predetermined voltages to the concentric electrodes and additional spherical optical power and/or astigmatism resulting from application of predetermined voltages to the two sets of linear electrodes, a wide range of optical powers and astigmatism can be achieved. One of ordinary skill in the art would recognize many variations, modifications, and alternatives.

Figure 7B:
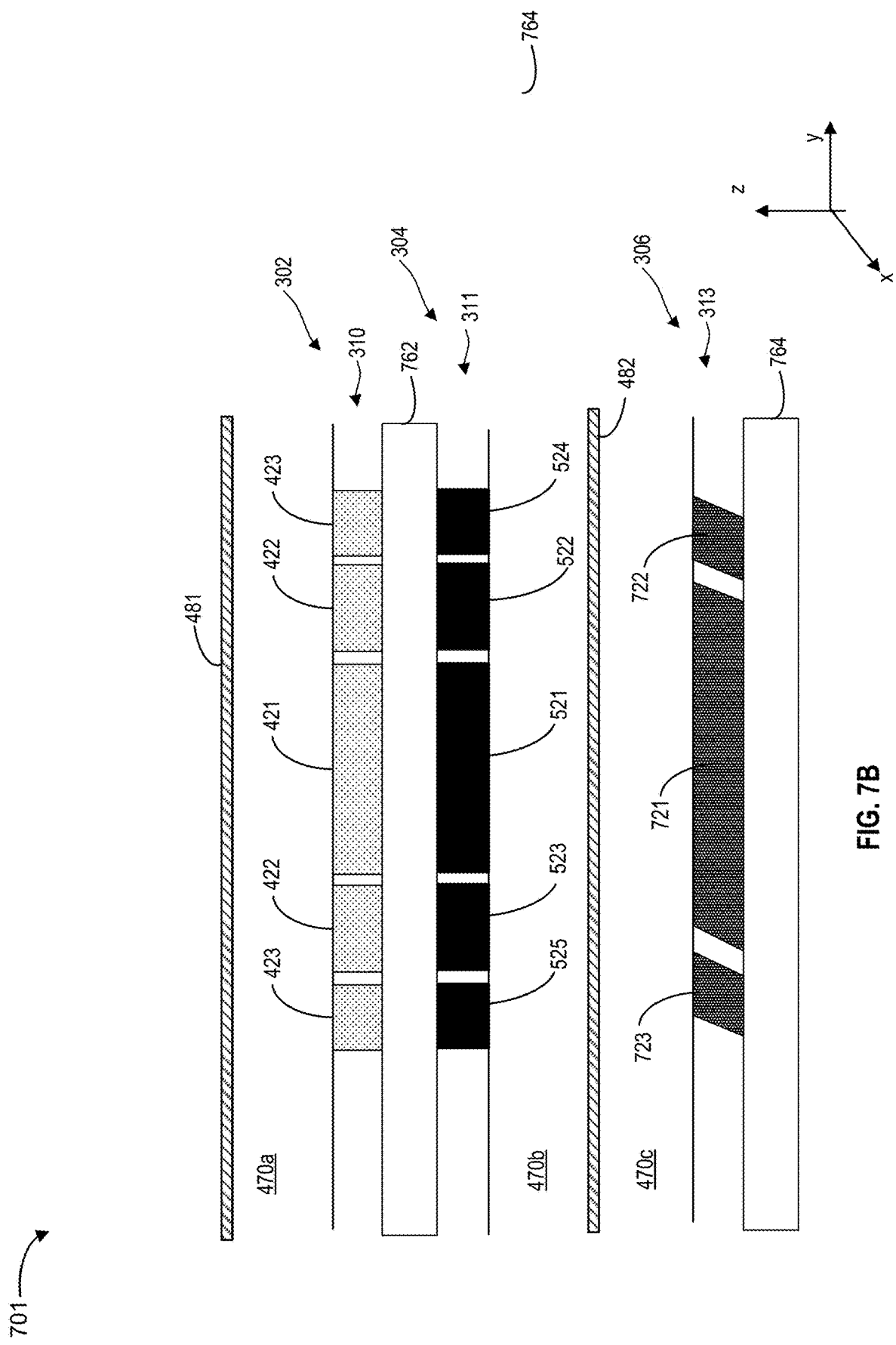
FIG. 7B illustrates a cross section view of a portion of an astigmatic liquid crystal Fresnel lens according to an embodiment of the present disclosure.

FIG. 7B illustrates a cross section view of a portion of an astigmatic liquid crystal Fresnel lens 701 according to an embodiment of the present disclosure. For purposes of clarity, only the central portion of the astigmatic liquid crystal Fresnel lens 701 is illustrated, but it will be appreciated that the electrical and optical structures illustrated in FIGS. 4C and 5B will be applicable to other portions of the astigmatic liquid crystal Fresnel lens 701. The astigmatic liquid crystal Fresnel lens 701 includes a circular liquid crystal Fresnel lens 302 having a set of concentric electrodes 310, a first cylindrical liquid crystal Fresnel lens 304 having a first set of linear electrodes 311, and a second cylindrical liquid crystal Fresnel lens 306 having a second set of linear electrodes 313. The first set of linear electrodes 311 are aligned with a vertical meridian of the first cylindrical liquid crystal Fresnel lens 304, as illustrated in FIG. 3A. The second set of linear electrodes 313 are positioned at an angle θ with respect to the vertical meridian of the first cylindrical liquid crystal Fresnel lens 304. For example, the second set of linear electrodes 313 may be positioned at an angle between 0 degrees 90 degrees and between 90 degrees and 180 degrees (but not including 0 degrees, 90 degrees, or 180 degrees), such as 45 degrees, with respect to the vertical meridian.

The concentric electrodes 310 are deposited on a first substrate 762, the first set of linear electrodes 311 are also deposited on the first substrate 762, and the second set of linear electrodes 313 are deposited on a second substrate 764. Thus, first substrate 762 can be referred to as a common substrate since both the concentric electrodes 310 and the first set of linear electrodes 311 are deposited or otherwise disposed on the first substrate 762. The first substrate 762 and the second substrate 764 are generally planar, although, as described more fully below, one or more surfaces of the first substrate 762 or the second substrate 764 may have non-planar features. The first substrate 762 and the second substrate 764 can be fabricated using a variety of materials that provide mechanical rigidity to support the Fresnel lens structure, electrodes, and the like. As an example, the first substrate 762 and the second substrate 764 can be fabricated using polymers characterized by light weight and high transparency, glass, and combinations thereof. One or more optical coatings, for example, anti-reflection coatings, scratch resistant coatings, and the like, can be deposited or otherwise adhered to the first substrate 762 and/or the second substrate 764 during manufacturing or once the astigmatic liquid crystal Fresnel lens has been assembled.

A first liquid crystal material 470a is sandwiched between a first common electrode 481 and concentric electrodes 310 and a second liquid crystal material 470b is sandwiched between a second common electrode 482, which may be mounted on a substrate (not shown) and the first set of linear electrodes 311. The first liquid crystal material 470a is in electrical communication with first common electrode 481 and concentric electrodes 310 and the second liquid crystal material 470b is in electrical communication with second common electrode 482 and the first set of linear electrodes 311. A Fresnel lens is formed by varying the index of refraction as a function of lateral position, i.e., the x-y plane. Portions of concentric electrodes 310 are illustrated by the center electrode 421, which is surrounded by the annular electrode 422, which, in turn, is surrounded by the annular electrode 423. The first cylindrical liquid crystal Fresnel lens 304 is disposed adjacent to the first substrate 762. Portions of the first set of linear electrodes 311 are illustrated by linear electrodes including central electrode 521, central outer electrodes 522 and 523, and intermediate outer electrodes 524 and 525. In this embodiment, the first liquid crystal material 470a and the second liquid crystal material 470b have uniform thicknesses as a function of lateral position (i.e., the x-y plane). In other embodiments, the first liquid crystal material 470a and the second liquid crystal material 470b can have a variation in layer thickness in the lateral plane to form additional Fresnel sections as appropriate to the particular application. Thus, in this embodiment, the Fresnel lens structure is formed as a result of variation in index of refraction of the first liquid crystal material 470a and the second liquid crystal material 470b resulting from variation in the applied voltage as a function of lateral position (i.e., in this embodiment, radial position extending in the x-y plane).

A third liquid crystal material 470c is positioned between the second common electrode 482 and the second set of linear electrodes 313 of the second cylindrical liquid crystal Fresnel lens 306. In the embodiment illustrated in FIG. 7B, the first set of linear electrodes 311 are positioned facing the second set of linear electrodes 313. The third liquid crystal material 470c is in electrical communication with the second common electrode 482 and the second set of linear electrodes 313. A Fresnel lens is formed by varying the index of refraction as a function of lateral position. Portions of the second set of linear electrodes 313 are illustrated by linear electrodes including central electrode 721 and peripheral electrodes 722 and 723. In this embodiment, the third liquid crystal material 470c has a uniform thickness as a function of lateral position (i.e., the x-y plane). In other embodiments the third liquid crystal material 470c can have a variation in layer thickness in the lateral plane to form additional Fresnel sections as appropriate to the particular application. Thus, in this embodiment, the lensing effect is formed as a result of variation in index of refraction of the third liquid crystal material 470c resulting from variation in the applied voltage as a function of lateral position.

In operation, voltages can be applied to either the first set of linear electrodes 311, the second set of linear electrodes 313, the concentric electrodes 310, or any combination thereof. Thus, the structure of the tunable, astigmatic liquid crystal Fresnel lens 701 is apparent in this embodiment, with the linear electrodes and the concentric electrodes being able to be operated in a combined manner. Given and angle θ, a power of astigmatism, and an axis of astigmatism, voltages for correcting the astigmatism can be determined for the first cylindrical liquid crystal Fresnel lens 304 and the second cylindrical liquid crystal Fresnel lens 306. Thus, in applications, for example, in dual-mode reading glasses that can be operated in a focus-free mode and in a focus mode, the embodiment illustrated in FIG. 7B can provide electrically controllable optical power including astigmatism correction for the user. Each of the linear electrodes can be electrically connected to one of a set of independent voltage sources and each of the concentric electrodes can be electrically connected to one of a second set of independent voltage sources.

Depending on the specific spherical optical power and astigmatism utilized in a particular application, the combination of the spherical optical power resulting from application of predetermined voltages to the concentric electrodes and additional spherical optical power and/or astigmatism resulting from application of predetermined voltages to the two sets of linear electrodes, a wide range of optical powers and astigmatism can be achieved. One of ordinary skill in the art would recognize many variations, modifications, and alternatives.

FIG. 7C illustrates a cross section view of a portion of an astigmatic liquid crystal Fresnel lens 702 according to an embodiment of the present disclosure. For purposes of clarity, only the central portion of the astigmatic liquid crystal Fresnel lens 702 is illustrated, but it will be appreciated that the electrical and optical structures illustrated in FIGS. 4C and 5B will be applicable to other portions of the astigmatic liquid crystal Fresnel lens 702. The astigmatic liquid crystal Fresnel lens 702 includes a circular liquid crystal Fresnel lens 302 having a set of concentric electrodes 310, a first cylindrical liquid crystal Fresnel lens 304 having a first set of linear electrodes 311, and a second cylindrical liquid crystal Fresnel lens 306 having a second set of linear electrodes 313. The first set of linear electrodes 311 are aligned with a vertical meridian of the first cylindrical liquid crystal Fresnel lens 304, as illustrated in FIG. 3A. The second set of linear electrodes 313 are positioned at an angle θ with respect to the vertical meridian of the first cylindrical liquid crystal Fresnel lens 304. For example, the second set of linear electrodes 313 may be positioned at an angle between 0 degrees and 90 degrees, such as 45 degrees, with respect to the vertical meridian.

The concentric electrodes 310 are deposited on a first substrate 762. The first set of linear electrodes 311 and the second set of linear electrodes 313 are deposited on a second substrate 764. The first substrate 762 and the second substrate 764 are generally planar, although, as described more fully below, one or more surfaces of the first substrate 762 and/or the second substrate 764 may have non-planar features. The first substrate 762 and the second substrate 764 can be fabricated using a variety of materials that provide mechanical rigidity to support the Fresnel lens structure, electrodes, and the like. As an example, the first substrate 762 and the second substrate 764 can be fabricated using polymers characterized by light weight and high transparency, glass, and combinations thereof. One or more optical coatings, for example, anti-reflection coatings, scratch resistant coatings, and the like, can be deposited or otherwise adhered to the first substrate 762 and/or the second substrate 764 during manufacturing or once the astigmatic liquid crystal Fresnel lens has been assembled.

A first liquid crystal material 470a is sandwiched between a first common electrode 481 and concentric electrodes 310. The first liquid crystal material 470a is in electrical communication with first common electrode 481 and concentric electrodes 310. A Fresnel lens is formed by varying the index of refraction as a function of lateral position, i.e., the x-y plane. Portions of concentric electrodes 310 are illustrated by the center electrode 421, which is surrounded by the annular electrode 422, which, in turn, is surrounded by the annular electrode 423. In this embodiment, the first liquid crystal material 470a has a uniform thickness as a function of lateral position (i.e., the x-y plane). In other embodiments, the first liquid crystal material 470a can have a variation in layer thickness in the lateral plane to form additional Fresnel sections as appropriate to the particular application. Thus, in this embodiment, the Fresnel lens structure is formed as a result of variation in index of refraction of the first liquid crystal material 470a resulting from variation in the applied voltage as a function of lateral position (i.e., in this embodiment, radial position extending in the x-y plane).

A second liquid crystal material 470b is positioned between a second common electrode 482, which may be attached to the first substrate 762 supporting the concentric electrodes 310 of the circular liquid crystal Fresnel lens 302, and the first set of linear electrodes 311 of the first cylindrical liquid crystal Fresnel lens 304. In the embodiment illustrated in FIG. 7C, the first set of linear electrodes 311 are positioned facing the concentric electrodes 310. The second liquid crystal material 470b is in electrical communication with the second common electrode 482 the first set of linear electrodes 311. A third liquid crystal material 470c is positioned between a third common electrode 483, which may be attached to a substrate 780, and the second set of linear electrodes 313 of the second cylindrical liquid crystal Fresnel lens 306. The third liquid crystal material 470c is in electrical communication with the third common electrode 483 the second set of linear electrodes 313. A Fresnel lens is formed by varying the index of refraction as a function of lateral position. The second cylindrical liquid crystal Fresnel lens 306 is disposed adjacent to the second substrate 764. Portions of the first set of linear electrodes 311 are illustrated by linear electrodes including central electrode 521, central outer electrodes 522 and 523, and intermediate outer electrodes 524 and 525. Portions of the second set of linear electrodes 313 are illustrated by linear electrodes including central electrode 721 and peripheral electrodes 722 and 723. In this embodiment, the second liquid crystal material 470b and the third liquid crystal material 470c have uniform thicknesses as a function of lateral position (i.e., the x-y plane). In other embodiments the second liquid crystal material 470b and/or the third liquid crystal material 470c can have a variation in layer thickness in the lateral plane to form additional Fresnel sections as appropriate to the particular application. Thus, in this embodiment, the lensing effect is formed as a result of variation in index of refraction of the second liquid crystal material 470b and the third liquid crystal material 470c resulting from variation in the applied voltage as a function of lateral position.

In operation, voltages can be applied to either the first set of linear electrodes 311, the second set of linear electrodes 313, the concentric electrodes 310, or any combination thereof. Thus, the structure of the tunable astigmatic liquid crystal Fresnel lens is apparent in this embodiment, with the linear electrodes and the concentric electrodes being able to be operated in a combined manner. Given a power of astigmatism and an axis of astigmatism, voltages for correcting the astigmatism can be determined for the first cylindrical liquid crystal Fresnel lens 304 and the second cylindrical liquid crystal Fresnel lens 306. Thus, in applications, for example, in dual-mode reading glasses that can be operated in a focus-free mode and in a focus mode, the embodiment illustrated in FIG. 7C can provide electrically controllable optical power including astigmatism correction for the user. Each of the linear electrodes can be electrically connected to one of a set of independent voltage sources and each of the concentric electrodes can be electrically connected to one of a second set of independent voltage sources.

Depending on the specific spherical optical power and astigmatism utilized in a particular application, the combination of the spherical optical power resulting from application of predetermined voltages to the concentric electrodes and additional spherical optical power and/or astigmatism resulting from application of predetermined voltages to the two sets of linear electrodes, a wide range of optical powers and astigmatism can be achieved. One of ordinary skill in the art would recognize many variations, modifications, and alternatives.

Figure 7D:
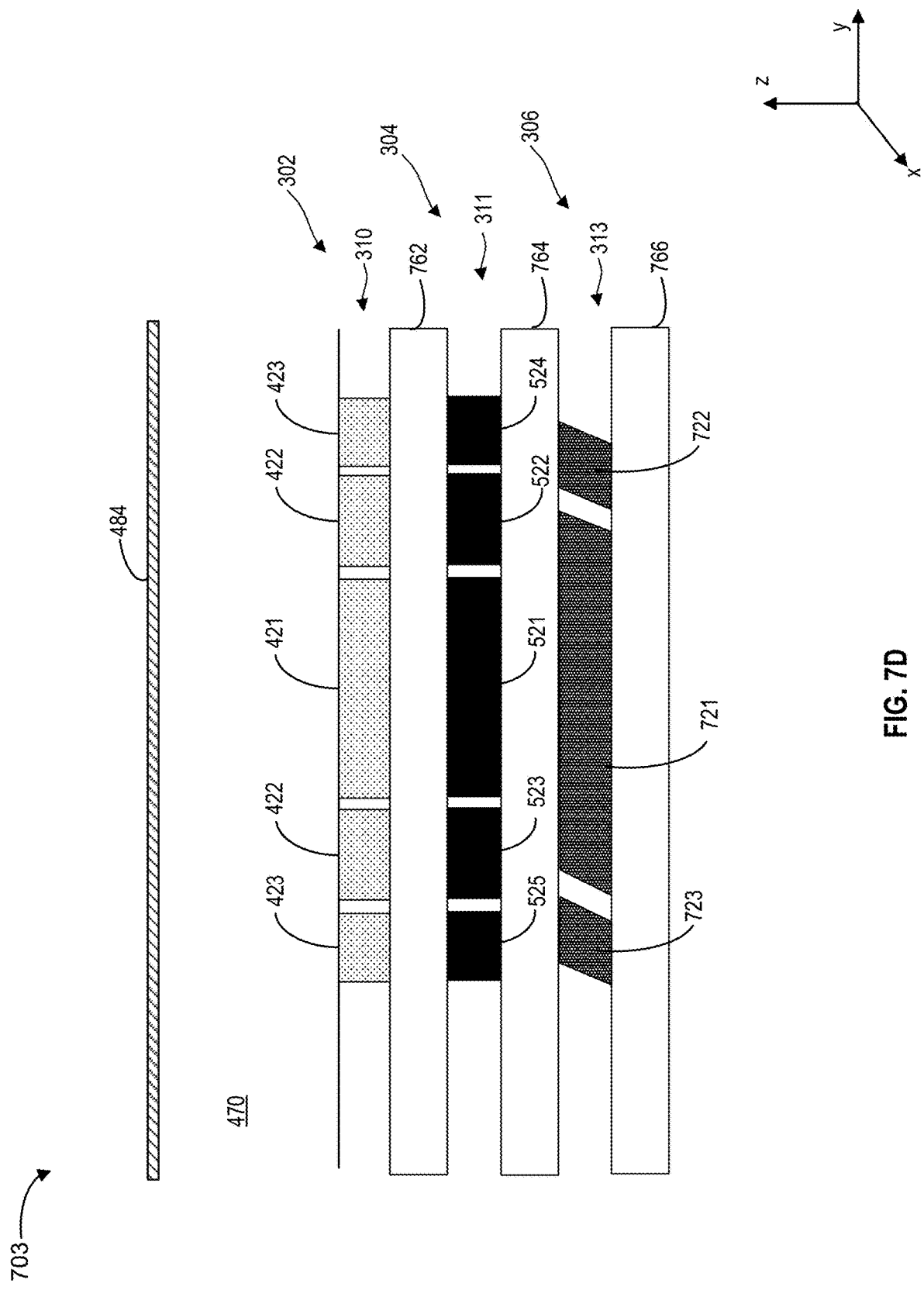
FIG. 7D illustrates a cross section view of a portion of an astigmatic liquid crystal Fresnel lens according to an embodiment of the present disclosure.

FIG. 7D illustrates a cross section view of a portion of an astigmatic liquid crystal Fresnel lens 703 according to an embodiment of the present disclosure. For purposes of clarity, only the central portion of the astigmatic liquid crystal Fresnel lens 703 is illustrated, but it will be appreciated that the electrical and optical structures illustrated in FIGS. 4C and 5B will be applicable to other portions of the astigmatic liquid crystal Fresnel lens 703. The astigmatic liquid crystal Fresnel lens 703 includes a circular liquid crystal Fresnel lens 302 having a set of concentric electrodes 310, a first cylindrical liquid crystal Fresnel lens 304 having a first set of linear electrodes 311, and a second cylindrical liquid crystal Fresnel lens 306 having a second set of linear electrodes 313. The first set of linear electrodes 311 are aligned with a vertical meridian of the first cylindrical liquid crystal Fresnel lens 304, as illustrated in FIG. 3A. The second set of linear electrodes 313 are positioned at an angle with respect to the vertical meridian of the first cylindrical liquid crystal Fresnel lens 304. For example, the second set of linear electrodes 313 may be positioned at an angle between 0 degrees and 90 degrees, such as 45 degrees, with respect to the vertical meridian.

The concentric electrodes 310 are deposited on a first substrate 762, the first set of linear electrodes 311 are deposited on a second substrate 764, and the second set of linear electrodes 313 are deposited on a third substrate 766. The first substrate 762, the second substrate 764, and the third substrate 766 are generally planar, although, as described more fully below, one or more surfaces of the first substrate 762, the second substrate 764, and/or the third substrate 766 may have non-planar features. The first substrate 762, the second substrate 764, and the third substrate 766 can be fabricated using a variety of materials that provide mechanical rigidity to support the Fresnel lens structure, electrodes, and the like. As an example, the first substrate 762, the second substrate 764, and the third substrate 766 can be fabricated using polymers characterized by light weight and high transparency, glass, and combinations thereof. One or more optical coatings, for example, anti-reflection coatings, scratch resistant coatings, and the like, can be deposited or otherwise adhered to the first substrate 762, the second substrate 764, and/or the third substrate 766 during manufacturing or once the astigmatic liquid crystal Fresnel lens has been assembled.

A liquid crystal material 470 is sandwiched between a common electrode 484 and concentric electrodes 310. The first set of linear electrodes 311 are disposed adjacent to the first substrate 762, and the second set of linear electrodes 313 are disposed adjacent to the second substrate 764. The liquid crystal material 470 is in electrical communication with common electrode 484, concentric electrodes 310, the first set of linear electrodes 311, and the second set of linear electrodes 313. A Fresnel lens is formed by varying the index of refraction as a function of lateral position, i.e., the x-y plane. Portions of concentric electrodes 310 are illustrated by the center electrode 421, which is surrounded by the annular electrode 422, which, in turn, is surrounded by the annular electrode 423. Portions of the first set of linear electrodes 311 are illustrated by linear electrodes including central electrode 521, central outer electrodes 522 and 523, and intermediate outer electrodes 524 and 525. Portions of the second set of linear electrodes 313 are illustrated by linear electrodes including central electrode 721 and peripheral electrodes 722 and 723. In this embodiment, the liquid crystal material 470 has a uniform thickness as a function of lateral position (i.e., the x-y plane). In other embodiments, the first liquid crystal material 470a can have a variation in layer thickness in the lateral plane to form additional Fresnel sections as appropriate to the particular application. Thus, in this embodiment, the Fresnel lens structure is formed as a result of variation in index of refraction of the first liquid crystal material 470a resulting from variation in the applied voltage as a function of lateral position (i.e., in this embodiment, radial position extending in the x-y plane).

In operation, voltages can be applied to either the first set of linear electrodes 311, the second set of linear electrodes 313, the concentric electrodes 310, or any combination thereof. Thus, the structure of the tunable astigmatic liquid crystal Fresnel lens is apparent in this embodiment, with the linear electrodes and the concentric electrodes being able to be operated in a combined manner. Given a power of astigmatism and an axis of astigmatism, voltages for correcting the astigmatism can be determined for the first cylindrical liquid crystal Fresnel lens 304 and the second cylindrical liquid crystal Fresnel lens 306. Thus, in applications, for example, in dual-mode reading glasses that can be operated in a focus-free mode and in a focus mode, the embodiment illustrated in FIG. 7D can provide electrically controllable optical power including astigmatism correction for the user. Each of the linear electrodes can be electrically connected to one of a set of independent voltage sources and each of the concentric electrodes can be electrically connected to one of a second set of independent voltage sources.

Depending on the specific spherical optical power and astigmatism utilized in a particular application, the combination of the spherical optical power resulting from application of predetermined voltages to the concentric electrodes and additional spherical optical power and/or astigmatism resulting from application of predetermined voltages to the two sets of linear electrodes, a wide range of optical powers and astigmatism can be achieved. Moreover, although specific arrangements of the common electrode 484, the first set of linear electrodes 311, the second set of linear electrodes 313, and the concentric electrodes 310 are illustrated in FIGS. 7A-7D, other arrangements can be utilized, for example, the positions of the first set of linear electrodes 311 and the second set of linear electrodes 313 can be interchanged, and are within the scope of the present disclosure. One of ordinary skill in the art would recognize many variations, modifications, and alternatives.

FIG. 8 illustrates a table including exemplary results of correcting astigmatism with an astigmatic liquid crystal Fresnel lens according to an embodiment of the present disclosure. The astigmatic liquid crystal Fresnel lens includes a circular liquid crystal Fresnel lens (e.g., circular liquid crystal Fresnel lens 302) with concentric electrodes. The circular liquid crystal Fresnel lens is characterized by a gradient index (GRIN) profile of:

$$n(r)=N_0+N_2 r^2,$$

where r is the radial position along the lens surface and $N_2$ is the second order coefficient that provides parabolic optical path difference (OPD). The astigmatic liquid crystal Fresnel lens also includes a first cylindrical liquid crystal Fresnel lens with first linear electrodes and a second liquid crystal Fresnel lens with second linear electrodes (e.g., the first cylindrical liquid crystal Fresnel lens 304 and the second cylindrical liquid crystal Fresnel lens 306, respectively). The first linear electrodes are aligned with a vertical meridian of the first cylindrical liquid crystal Fresnel lens and the second linear electrodes are aligned at a 45 degree angle with respect to the vertical meridian of the first cylindrical liquid crystal Fresnel lens. A Zernike standard phase was used to introduce the powers of astigmatism and the axes of astigmatism.

Referring to FIG. 8, varying powers of astigmatism and axes of astigmatism can be corrected by the astigmatic liquid crystal Fresnel lens. The table shows four examples of a root-mean-square (RMS) wavefront error, a wave-front map, a power of astigmatism in diopters, a power of astigmatism in millimeters, and an axis of astigmatism in degrees. By solving equations 4 and 5 using the angle θ, the power of astigmatism ($f_A$), and the axis of astigmatism (α), the power of the first cylindrical liquid crystal Fresnel lens ($f_y$) and the power of the second cylindrical liquid crystal Fresnel lens ($f_{xy}$) that are appropriate to correct the astigmatism characterized by the listed power of astigmatism and the axis of astigmatism are determined.

For example, for an RMS wavefront error of 1.22 waves, which corresponds to a power of astigmatism of 0.6 diopters and an axis of astigmatism of 0 degrees, the power of the first cylindrical liquid crystal Fresnel lens is determined to be 0.6 diopters and the power of the second cylindrical liquid crystal Fresnel lens is determined to be 0 diopters. Additionally, for an RMS wavefront error of 1.22 waves, which corresponds to a power of astigmatism of 0.6 diopters and an axis of astigmatism of 18 degrees, the power of the first cylindrical liquid crystal Fresnel lens is determined to be 0.48 diopters and the power of the second cylindrical liquid crystal Fresnel lens is determined to be 0.35 diopters. For an RMS wavefront error of 3.0 waves, which corresponds to a power of astigmatism of 1.5 diopters and an axis of astigmatism of −57 degrees, the power of the first cylindrical liquid crystal Fresnel lens is determined to be 0.61 diopters and the power of the second cylindrical liquid crystal Fresnel lens is determined to be 1.37 diopters. In addition, for an RMS wavefront error of 4.4 waves, which corresponds to a power of astigmatism of 2.15 diopters and an axis of astigmatism of 85 degrees, the power of the first cylindrical liquid crystal Fresnel lens is determined to be 2.12 diopters and the power of the second cylindrical liquid crystal Fresnel lens is determined to be −0.37 diopters. This indicates that powers of astigmatism and axes of astigmatism of varying levels can be corrected by the astigmatic liquid crystal Fresnel lens described herein.

FIG. 9 illustrates an example of a flow 900 for operating an astigmatic liquid crystal Fresnel lens according to an embodiment of the present disclosure. The flow starts at operation 902, where a first value for a power of astigmatism and a second value for an axis of astigmatism are assigned. The first value and the second value may be default values. The values can be assigned if the power of astigmatism and/or the axis of astigmatism for a user are unknown.

The flow continues with operation 904, where a power of a first cylindrical lens and a power of a second cylindrical lens are determined based at least in part on the power of astigmatism and the axis of astigmatism. The first cylindrical lens can be the first cylindrical liquid crystal Fresnel lens 304 illustrated in FIGS. 3 and 7A-7D. The second cylindrical lens can be the second cylindrical liquid crystal Fresnel lens 306 illustrated in FIGS. 3 and 7A-7D. As discussed above, the power of the first cylindrical lens and the power of the second cylindrical lens can be determined by solving equations 4 and 5, respectively.

The flow continues with operation 906, where one or more voltages are applied to achieve the power of the first cylindrical lens and the power of the second cylindrical lens. The voltages can be applied to linear electrodes of the first cylindrical lens and the second cylindrical lens. The linear electrodes of the first cylindrical lens are aligned with a vertical meridian of the first cylindrical lens, and the linear electrodes of the second cylindrical lens are oriented at an angle with respect to the vertical meridian. The voltages may be the same or different depending on the power of the first cylindrical lens and the power of the second cylindrical lens. Thus, independent voltages can be applied to the linear electrodes of the first cylindrical lens and the linear electrodes of the second cylindrical lens.

The flow continues with operation 908, where it is determined whether the astigmatism is corrected. A user may be asked whether their vision has improved in response to the application of the one or more voltages to the first cylindrical lens and the second cylindrical lens. The user can provide an indication of whether the astigmatism is corrected with the one or more voltages that have been applied. Alternatively, a vision test may be administered to the user while the one or more voltages are applied in order to determine whether the astigmatism has been partially or fully corrected. A negative indication from the user, or a score below a threshold on the vision test, can indicate that the astigmatism is not fully corrected. As a result, the flow returns to operation 902, where values are assigned to the power of astigmatism and the axis of astigmatism. The next values assigned may be a predetermined interval different from the initial values assigned. Thus, as the iteration proceeds, incremental changes are made to the assigned power of astigmatism and the axis of astigmatism until the astigmatism is corrected.

Upon an indication that the astigmatism is fully corrected or corrected to a level exceeding a threshold, the flow ends at operation 910. The power of astigmatism and the axis of astigmatism for the user may be saved for future use of the astigmatic liquid crystal Fresnel lens by the user.

It should be appreciated that the specific steps illustrated in FIG. 9 provide a particular method of operating an astigmatic liquid crystal Fresnel lens according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 10:
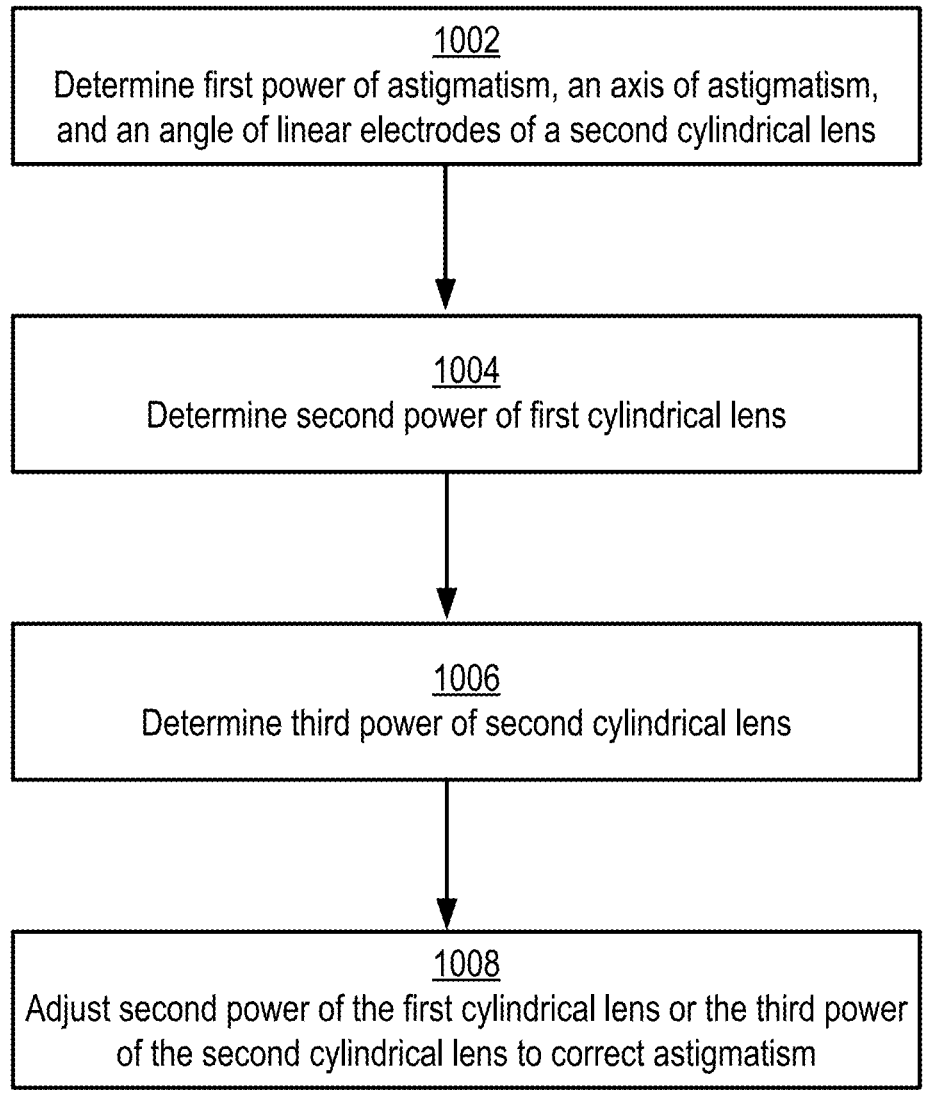
FIG. 10 illustrates an example of a flow for operating an astigmatic liquid crystal Fresnel lens according to another embodiment of the present disclosure.

FIG. 10 illustrates an example of a flow 1000 for operating an astigmatic liquid crystal Fresnel lens according to another embodiment of the present disclosure. The flow starts at operation 1002, where a first power of astigmatism, an axis of astigmatism, and an angle of linear electrodes of a second cylindrical lens with respect to the vertical meridian are determined. The angle may be set during manufacturing, or the angle may be adjustable. The first power of astigmatism and the axis of astigmatism may be determined from vision tests performed by a physician or other medical personnel in determining a prescription for eyeglasses. Alternatively, a user may provide an indication of the power of astigmatism and the axis of astigmatism.

The flow continues with operation 1004, where a second power of a first cylindrical lens is determined. The first cylindrical lens can be the first cylindrical liquid crystal Fresnel lens 304 illustrated in FIGS. 3 and 7A-7D. The first cylindrical lens includes a first set of linear electrodes aligned with a vertical meridian of the first cylindrical lens. One or more voltages can be applied to the first set of linear electrodes to generate the second power of the first cylindrical lens. The second power of the first cylindrical lens can be determined by solving equation 4 using the angle, the first power of astigmatism, and the axis of astigmatism.

The flow continues with operation 1006, where a third power of the second cylindrical lens is determined. The second cylindrical lens can be the second cylindrical liquid crystal Fresnel lens 306 illustrated in FIGS. 3 and 7A-7D. The second cylindrical lens includes the second set of linear electrodes oriented at the angle with respect to the vertical meridian of the first cylindrical lens. One or more voltages can be applied to the second set of linear electrodes to generate the third power of the second cylindrical lens. The third power of the second cylindrical lens can be determined by solving equation 5 using the angle, the first power of astigmatism and the axis of astigmatism.

The flow continues with operation 1008, where the second power of the first cylindrical lens or the third power of the second cylindrical lens are adjusted to correct the astigmatism. For example, if the determined second power of the first cylindrical lens or the determined third power of the second cylindrical lens are determined to be different than current powers of either of the first or second cylindrical lenses, then the power(s) can be adjusted to the determined powers to correct for the astigmatism. The second power of the first cylindrical lens and the third power of the second cylindrical lens can generate an astigmatism that can compensate for the first power of astigmatism and the axis of astigmatism.

It should be appreciated that the specific steps illustrated in FIG. 10 provide a particular method of operating an astigmatic liquid crystal Fresnel lens according to an embodiment of the present disclosure. Other sequences of steps may also be performed according to alternative embodiments. For example, alternative embodiments of the present disclosure may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11:
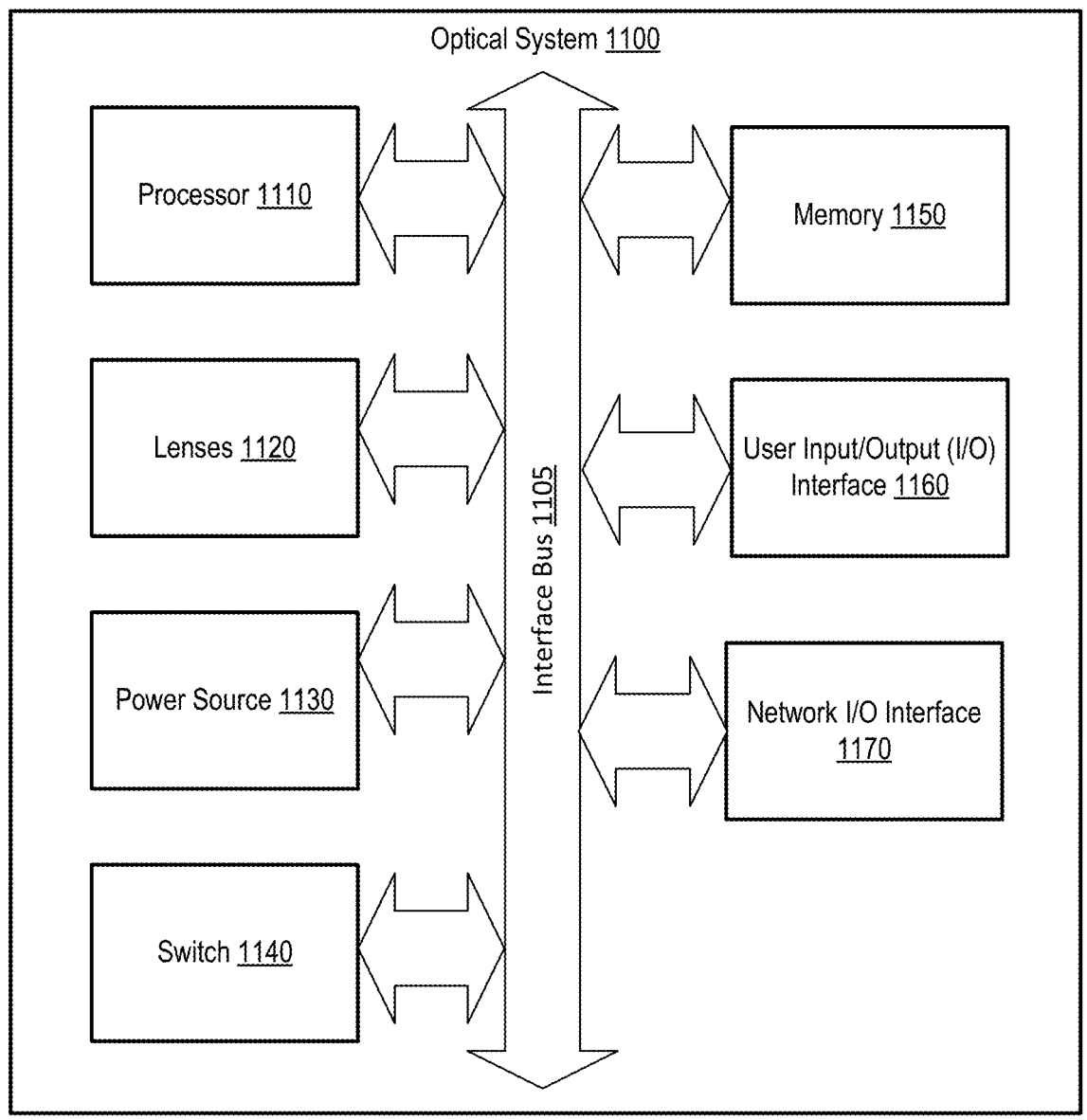
FIG. 11 is a block diagram of an example of an optical system for correcting astigmatism according to an embodiment of the present disclosure.

FIG. 11 is a block diagram of an example of an optical system for correcting astigmatism according to an embodiment of the present disclosure. The optical system 1100 may be eyeglasses, such as the pair of glasses illustrated in FIG. 1. The optical system 1100 includes a processor 1110, lenses 1120, a power source 1130, and a switch 1140. The optical system 1100 also includes storage device 1150, user input/output (I/O) interface 1160, and network I/O interface 1170. The various elements of the optical system 100 can be connected via interface bus 1105. The interface bus 1105 is configured to communicate, transmit, and transfer data, controls, and commands among the various components of the optical system 1100. The storage device 1150 can include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The storage device 1150 may also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the optical system 1100.

The processor 1110 is configured to execute the stored instructions and includes, for example, a logical processing unit, a microprocessor, a digital signal processor, and other processors. The storage device 1150 and/or the processor 1110 can be virtualized and can be hosted within another computer system of, for example, a cloud network or a data center. The user I/O interface 1160 can include user interfaces, such as a keyboard, screen (e.g., a touch screen), microphone, speaker, other input/output devices, and computing components, such as graphical processing units, serial ports, parallel ports, universal serial buses, and other input/output peripherals. The network I/O interface 1170 is configured to facilitate communication between the optical system 1100 and other computing devices over a communications network and include, for example, a network interface controller, modem, wireless and wired interface cards, antenna, and other communication peripherals. The user I/O interface 1160 and network I/O interface 1170 are connected to the processor 1110 through any of the ports coupled to the interface bus 1105.

The lenses 1120 each include a circular lens and two cylindrical lenses. For example, the lenses 1120 can utilize the design of the astigmatic liquid crystal Fresnel lens 300 illustrated in FIG. 3A, including circular liquid crystal Fresnel lens 302 as the circular lens. The two cylindrical lenses can be the first cylindrical liquid crystal Fresnel lens 304 and the second cylindrical liquid crystal Fresnel lens 306. The processor 1110 can perform the methods described herein, including determining powers for the two cylindrical lenses based on a power of astigmatism and an axis of astigmatism. The processor 1110 may perform the methods in conjunction with a non-transitory data storage device (e.g., storage device 1150), a user input/output (I/O) interface 1160, or a network I/O interface communicatively coupled to a network (not shown). In such examples, the powers for the two cylindrical lenses for a user may be stored for future use of the eyeglasses by the user. As an example, a user can input a power of astigmatism and an axis of astigmatism using user I/O interface 1160, which can be implemented as a touch screen or other suitable device or devices that enable a user to view or otherwise obtain system settings and input information used by the processor 1110.

In an embodiment, the power of astigmatism and an axis of astigmatism can be stored in the storage device 1150, which can be accessed by processor 1110 in order to compute the powers for the two cylindrical lenses based on the power of astigmatism and axis of astigmatism that are stored in the storage device 1150. Additionally, the storage device 1150 can store the power of the circular Fresnel lens.

The user can connect the lenses 1120 to the power source 1130, such as a battery, and the controller 132 by actuating the switch 1140. This can switch the lenses 1120 from a non-powered mode in which the lenses 1120 are characterized by no optical power to a powered mode in which the lenses 1120 are characterized by an optical power, a power of astigmatism, and an axis of astigmatism. Thus, the optical system 1100 provides astigmatism correction.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. Astigmatism-corrected eyeglasses comprising:
a frame;
a plurality of lenses disposed in the frame, wherein each of the plurality of lenses comprises:
a first common electrode;
a first liquid crystal material;
a first circular, variable focus liquid crystal Fresnel lens disposed along an optical axis and comprising a first set of electrodes arranged in a first concentric pattern and in electrical communication with the first liquid crystal material and the first common electrode;
a second common electrode;
a second liquid crystal material;
a first cylindrical lens disposed along the optical axis and comprising a second set of electrodes aligned with a first vertical meridian of the first cylindrical lens and in electrical communication with the second liquid crystal material and the second common electrode;
a third common electrode;
a third liquid crystal material;
a second cylindrical lens disposed along the optical axis and comprising a third set of electrodes oriented at a first angle with respect to the first vertical meridian and in electrical communication with the third liquid crystal material and the third common electrode;
a second circular, variable focus liquid crystal Fresnel lens disposed along the optical axis and having a fourth set of electrodes arranged in a second concentric pattern;
a third cylindrical lens disposed along the optical axis and comprising a fifth set of electrodes aligned with a second vertical meridian of the third cylindrical lens; and
a fourth cylindrical lens disposed along the optical axis and having a sixth set of electrodes oriented at a second angle with respect to the second vertical meridian.

2. The astigmatism-corrected eyeglasses of claim 1, wherein a first power of the first cylindrical lens, a second power of the second cylindrical lens, a third power of the third cylindrical lens, and a fourth power of the fourth cylindrical lens are used to correct a fifth power of astigmatism and an astigmatism axis, wherein the first power, the second power, the third power, and the fourth power are adjustable.

3. The astigmatism-corrected eyeglasses of claim 1, wherein the first set of electrodes, the second set of electrodes, the third set of electrodes, the fourth set of electrodes, the fifth set of electrodes, and the sixth set of electrodes are each electrically connected to an independent voltage source.

4. The astigmatism-corrected eyeglasses of claim 1, wherein the second circular, variable focus liquid crystal Fresnel lens is positioned between the second cylindrical lens and the third cylindrical lens.

5. An optical system comprising:
a first variable focus liquid crystal circular lens disposed along an optical axis and having a first set of electrodes arranged in a first concentric pattern;
a first cylindrical lens disposed along the optical axis and having a first vertical meridian and a second set of electrodes oriented along a first axis parallel to the first vertical meridian;
a second cylindrical lens disposed along the optical axis and having a third set of electrodes oriented at a first angle with respect to the first axis;
a second variable focus liquid crystal circular lens disposed along the optical axis and having a fourth set of electrodes arranged in a second concentric pattern;
a third cylindrical lens disposed along the optical axis and having a second vertical meridian and a fifth set of electrodes oriented along a second axis parallel to the second vertical meridian; and
a fourth cylindrical lens disposed along the optical axis and having a sixth set of electrodes oriented at a second angle with respect to the second axis.

6. The optical system of claim 5, further comprising:
a first liquid crystal material adjacent the first set of electrodes and in electrical communication with the first set of electrodes.

7. The optical system of claim 6, further comprising a second liquid crystal material adjacent the second set of electrodes and a third liquid crystal material adjacent the third set of electrodes, wherein the second set of electrodes is in electrical communication with the second liquid crystal material and the third set of electrodes is in electrical communication with the third liquid crystal material.

8. The optical system of claim 6, further comprising a common electrode in electrical communication with the first liquid crystal material.

9. The optical system of claim 5, wherein a first power of the first cylindrical lens and a second power of the second cylindrical lens are characterized by a third power of astigmatism and an astigmatism axis.

10. The optical system of claim 5, wherein the first set of electrodes, the second set of electrodes, the third set of electrodes, the fourth set of electrodes, the fifth set of electrodes, and the sixth set of electrodes are each electrically connected to an independent voltage source.

11. The optical system of claim 5, wherein the first angle with respect to the first axis is greater than 0° and less than 90° or greater than 90° and less than 180°.

12. The optical system of claim 5, wherein the first set of electrodes of the first variable focus liquid crystal circular lens and the second set of electrodes of the first cylindrical lens are disposed on a common substrate.

13. The optical system of claim 5, wherein:
the first set of electrodes comprises a first center electrode and a first set of annular electrodes; and
the fourth set of electrodes comprises a second center electrode and a second set of annular electrodes.

14. The optical system of claim 5, wherein the second variable focus liquid crystal circular lens is positioned between the second cylindrical lens and the third cylindrical lens.

15. An optical system comprising:
a frame;
a left tunable astigmatic lens supported in a left portion of the frame;
a right tunable astigmatic lens supported in a right portion of the frame; and
a power source electrically coupled to the left tunable astigmatic lens and the right tunable astigmatic lens;
wherein each of the left tunable astigmatic lens and the right tunable astigmatic lens includes:
a first variable focus liquid crystal circular lens disposed along an optical axis and having a first set of electrodes arranged in a first concentric pattern;
a first cylindrical lens disposed along the optical axis and having a first vertical meridian and a second set of electrodes oriented along a first axis parallel to the first vertical meridian;
a second cylindrical lens disposed along the optical axis and having a third set of electrodes oriented at a first angle with respect to the first axis;
a second variable focus liquid crystal circular lens disposed along the optical axis and having a fourth set of electrodes arranged in a second concentric pattern;
a third cylindrical lens disposed along the optical axis and having a second vertical meridian and a fifth set of electrodes oriented along a second axis parallel to the second vertical meridian; and
a fourth cylindrical lens disposed along the optical axis and having a sixth set of electrodes oriented at a second angle with respect to the second axis.

16. The optical system of claim 15, further comprising:
a switch electrically coupled to the power source; and
a controller electrically coupled to the left tunable astigmatic lens and the right tunable astigmatic lens.

17. The optical system of claim 16, further comprising an eye tracking system electrically coupled to the controller.

18. The optical system of claim 15, wherein a combined power of the first cylindrical lens and the second cylindrical lens is characterized by a third power of astigmatism and an astigmatism axis.

19. The optical system of claim 15, wherein the first set of electrodes, the second set of electrodes, the third set of electrodes, the fourth set of electrodes, the fifth set of electrodes, and the sixth set of electrodes are each electrically connected to an independent voltage source.

20. The optical system of claim 15, wherein the second variable focus liquid crystal circular lens is positioned between the second cylindrical lens and the third cylindrical lens.

* * * * *